(12) United States Patent
Oguri et al.

(10) Patent No.: US 9,252,646 B2
(45) Date of Patent: Feb. 2, 2016

(54) MOTOR WITH DIFFUSION STOPPER

(71) Applicant: ASMO CO., LTD., Shizuoka-ken (JP)

(72) Inventors: Ryousuke Oguri, Hamamatsu (JP);
Yousuke Kanbe, Toyohashi (JP);
Tomoki Yamashita, Hamamatsu (JP);
Hiroaki Honma, Toyohashi (JP);
Nakatsune Shirai, Toyohashi (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 0 days.

(21) Appl. No.: 14/254,571

(22) Filed: Apr. 16, 2014

(65) Prior Publication Data

US 2014/0312731 A1 Oct. 23, 2014

(30) Foreign Application Priority Data

Apr. 22, 2013 (JP) ................... 2013-089671
Dec. 24, 2013 (JP) ................... 2013-265356

(51) Int. Cl.
| | |
|---|---|
| *H01R 39/38* | (2006.01) |
| *H02K 13/00* | (2006.01) |
| *H02K 5/14* | (2006.01) |
| *H02K 5/167* | (2006.01) |
| *H01R 39/40* | (2006.01) |
| *H02K 7/116* | (2006.01) |

(52) U.S. Cl.
CPC .............. *H02K 13/00* (2013.01); *H02K 5/148* (2013.01); *H02K 5/1672* (2013.01); *H01R 39/40* (2013.01); *H02K 7/1166* (2013.01)

(58) Field of Classification Search
CPC ...... H01R 39/40; H01R 39/38; H01R 39/381; H02K 5/148; H02K 5/225

USPC ......... 310/238, 239, 240, 241, 242, 243, 244, 310/245, 246, 247, 248, 249, 250, 251, 252, 310/253
See application file for complete search history.

(56) References Cited

U.S. PATENT DOCUMENTS

| | | | | | |
|---|---|---|---|---|---|
| 2,919,360 | A | * | 12/1959 | Mishima | 310/238 |
| 3,135,887 | A | * | 6/1964 | Schaffan | 310/154.08 |
| 3,271,013 | A | * | 9/1966 | Chambers et al. | 416/63 |
| 4,225,798 | A | * | 9/1980 | Barrett | 310/154.36 |
| 4,983,873 | A | * | 1/1991 | Tanaka et al. | 310/248 |
| 5,015,897 | A | * | 5/1991 | Inagaki et al. | 310/83 |
| 5,089,735 | A | * | 2/1992 | Sawaguchi et al. | 310/88 |
| 5,280,212 | A | * | 1/1994 | Oba | 310/248 |
| 5,440,186 | A | * | 8/1995 | Forsell et al. | 310/239 |
| 5,949,173 | A | * | 9/1999 | Wille et al. | 310/220 |
| 6,097,128 | A | * | 8/2000 | Ko | 310/239 |
| 7,012,352 | B2 | * | 3/2006 | Fujita et al. | 310/239 |
| 8,513,852 | B2 | * | 8/2013 | Klumpp et al. | 310/239 |
| 2008/0001493 | A1 | * | 1/2008 | Braml et al. | 310/239 |
| 2008/0030098 | A1 | * | 2/2008 | Shawcross | 310/239 |
| 2010/0320857 | A1 | * | 12/2010 | Mizutani | 310/83 |
| 2011/0095630 | A1 | * | 4/2011 | Jiang et al. | 310/72 |

FOREIGN PATENT DOCUMENTS

JP 2012-178965 A 9/2012

* cited by examiner

*Primary Examiner* — Hanh Nguyen
(74) *Attorney, Agent, or Firm* — Christensen Fonder P.A.

(57) ABSTRACT

A motor includes a rotation shaft, a commutator, power supply brushes, and a brush holder. The brush holder includes an opposing portion that faces an end face of the commutator in an axial direction, a bearing holder, and a diffusion stopper. The diffusion stopper is arranged in a portion of the opposing portion located toward the outer side in the radial direction from the bearing holder and limits the diffusion of abrasion powder of the power supply brushes. The diffusion stopper is projected toward the commutator in the axial direction or recessed in the axial direction.

7 Claims, 9 Drawing Sheets

MOTOR WITH DIFFUSION STOPPER

BACKGROUND OF THE INVENTION

The present invention relates to a motor.

An armature of a conventional motor includes a rotation shaft and an armature core and a commutator, which are fixed to the rotation shaft. An armature coil is wound around the armature core. Power is supplied to the armature through a power supply brush that is in slidable contact with the commutator. Japanese Laid-Open Patent Publication No. 2012-178965 describes an example of a motor including an armature coil, which is accommodated in a yoke housing, and a power supply brush, which is held by a brush holder attached to an open end of the yoke housing. Further, a commutator is arranged in a recess of the brush holder. A speed reduction unit that reduces the rotation speed of the rotation shaft and outputs the reduced speed is coupled to the opening of the yoke housing.

In the motor including the power supply brush described above, when the power supply brush is in slidable contact with the outer circumferential surface of the commutator that rotates integrally with the rotation shaft, the power supply brush wears and produces abrasion powder. When the abrasion powder diffuses and deposits in the motor, the abrasion power may form a conductive line between the power supply brush and the rotation shaft and between the power supply brush and the armature core. This may cause an insulation defect.

SUMMARY OF THE INVENTION

It is an object of the present invention to provide a motor capable of limiting insulation defects caused by the abrasion powder from the power supply brush.

One aspect of the present invention is a motor including a rotation shaft, a commutator that rotates integrally with the rotation shaft, a plurality of power supply brushes that contact the commutator in a slidable manner, and a brush holder that holds the power supply brushes. The brush holder includes an opposing portion that faces an end face of the commutator in an axial direction, a bearing holder that holds a bearing located on the opposing portion to axially support the rotation shaft, and a diffusion stopper arranged in a portion of the opposing portion located toward an outer side in a radial direction from the bearing holder. The diffusion stopper limits diffusion of abrasion powder from the power supply brushes, and the diffusion stopper projects toward the commutator in the axial direction or is recessed in the axial direction.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of a motor will now be described.

Figure 1:
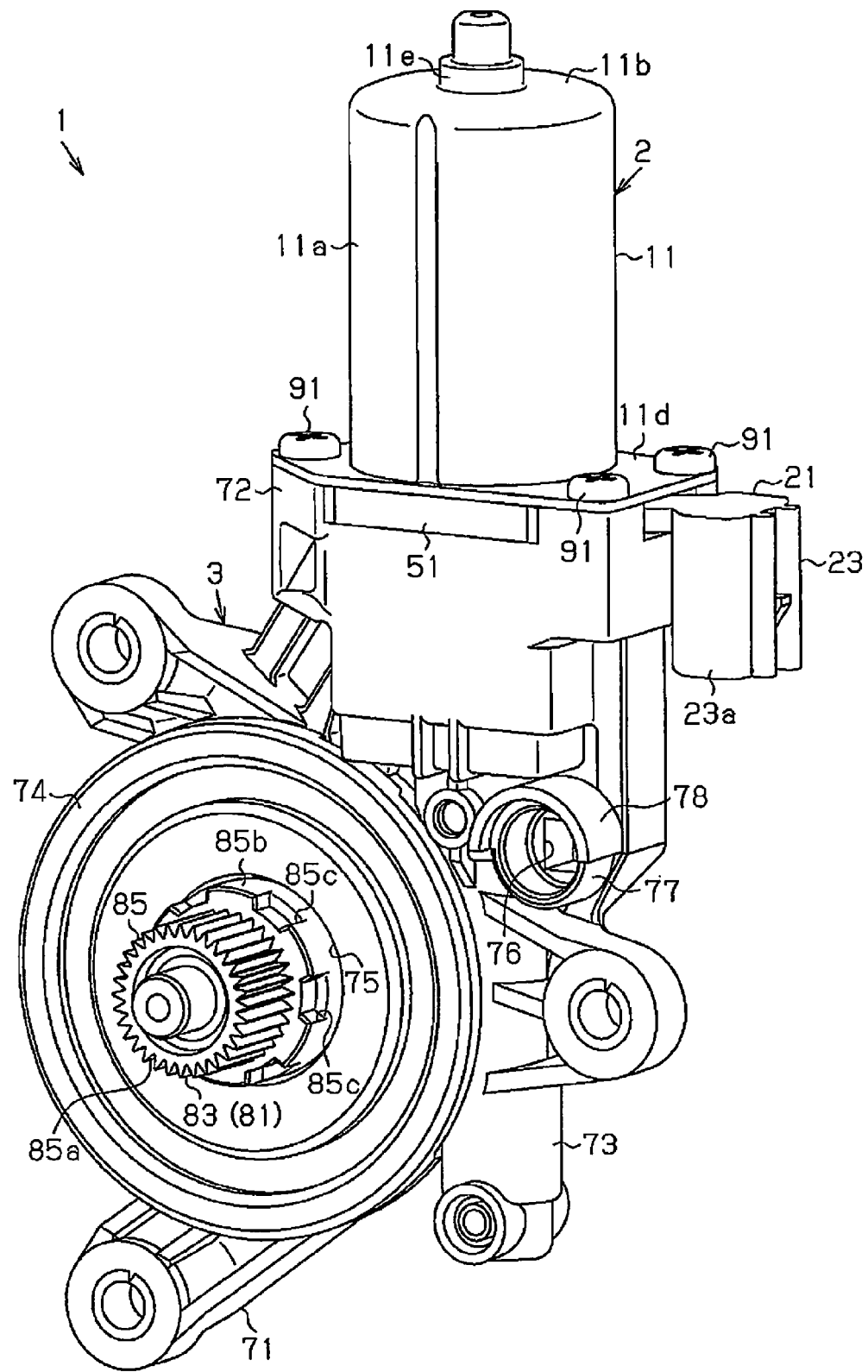
FIG. 1 is a perspective view of a motor according to one embodiment of the present invention.

A motor 1 of the present embodiment shown in FIG. 1 is used as a drive source of a power window device that raises and lowers a window glass of a vehicle with electric power. The motor 1 includes a motor unit 2, which is shown in the upper part of FIG. 1 and generates rotation force, and a speed reduction unit 3, which is arranged at an output side of the motor unit 2 (lower side of the motor unit 2 as viewed in FIG. 1).

Figure 2:
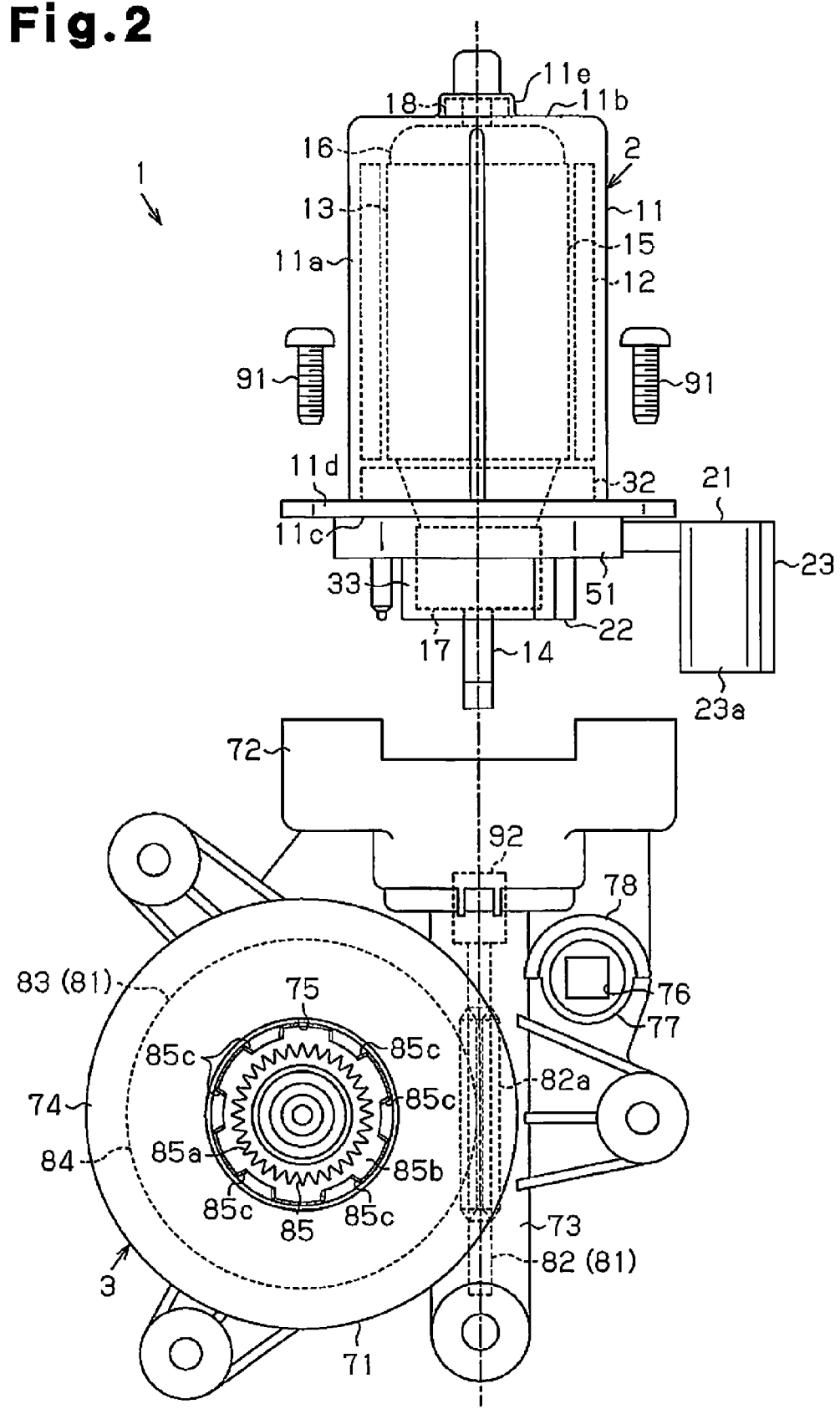
FIG. 2 is an exploded view of the motor shown in FIG. 1.

Referring to FIGS. 1 and 2, a yoke housing 11 (hereinafter referred to as a yoke 11) of the motor unit 2 is tubular and has a closed end. The yoke 11 includes a tubular side wall 11a, a closed end 11b that closes one axial end (upper end as viewed in FIG. 1) of the side wall 11a, an open end 11c located at the lower end of the side wall 11a (lower end as viewed in FIG. 1), and a flange 11d arranged at the open end 11c. A bearing retainer 11e is formed in the central portion of the closed end 11b of the yoke 11. The bearing retainer 11e is tubular and includes a closed end and an open end that opens to the inner side of the yoke 11. The flange 11d extends from the open end 11c toward the outer side of the yoke 11. The flange 11d extends orthogonal to the side wall 11a (the axial direction of the side wall 11a).

Referring to FIG. 2, magnets 12 are fixed to the inner circumferential surface of the yoke 11, that is, the inner circumferential surface of the side wall 11a. A rotatable armature 13 is arranged at the inner side of the magnet 12 in the yoke 11. The armature 13 includes a rotation shaft 14, an armature core 15 fixed to and rotated integrally with the rotation shaft 14, armature coils 16 wound around the armature core 15, and a commutator 17 fixed to and rotated integrally with the rotation shaft 14. The rotation shaft 14, which is substantially cylindrical, extends through the central part of the yoke 11 and extends in the axial direction of the side wall 11a. A bearing 18 is accommodated in the bearing retainer 11e to rotatably support a basal end (upper end as viewed in FIG. 2) of the rotation shaft 14. The rotation shaft 14 has a distal end (lower end as viewed in FIG. 2) that projects out of the yoke 11 from the open end 11c.

The armature core 15 is fitted and fixed to the rotation shaft 14. The armature core 15 faces the magnets 12 in the radial direction of the rotation shaft 14 inside the yoke 11. The commutator 17 is cylindrical shape and fitted and fixed to a portion of the rotation shaft 14 located toward the distal end from the armature core 15. Specifically, the commutator 17 is fixed to a portion of the rotation shaft 14 projecting out of the yoke 11 from the open end 11c and arranged outside the yoke 11. The commutator 17 and the portion of the rotation shaft 14 projecting out of the yoke 11 from the open end 11c are located in a gear housing 71. The gear housing 71 forms the shell of the speed reduction unit 3. The commutator 17 includes segments 17a arranged in the circumferential direction on the outer circumferential surface of the commutator 17. Adjacent ones of the segments 17a are spaced apart from each other in the circumferential direction. This insulates the segments 17a from one another. The outer circumferential surface of the commutator 17 is formed by the cylindrical outer circumferential surfaces of the segments 17a. The armature coils 16 are connected to the segments 17a.

A brush holder 21 is attached to the open end 11c of the yoke 11. The brush holder 21 is formed from an insulative resin material. The brush holder 21 includes a holder main body 22, which closes the open end 11c of the yoke 11, and a connector unit 23, which is formed integrally with the holder main body 22.

Figure 3:
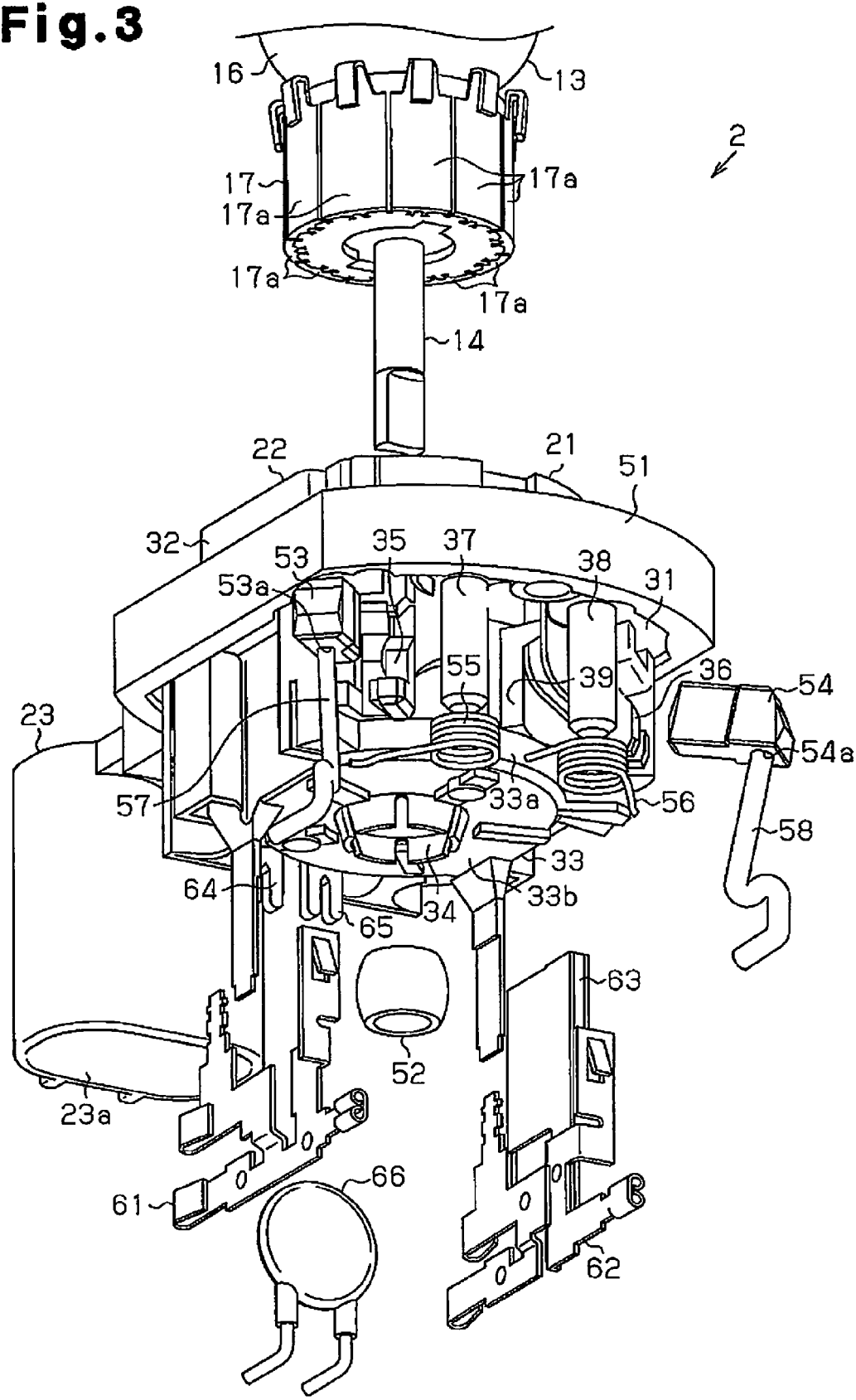
FIG. 3 is an exploded perspective view of a motor unit shown in FIG. 2.

As shown in FIGS. 2 and 3, the holder main body 22 includes a base 31 that is located outside the yoke 11 and is axially adjacent to the flange 11d. The base 31 is flat and extends in a direction orthogonal to the axial direction of the rotation shaft 14. The base 31 in the direction orthogonal to the axial direction of the rotation shaft 14 is slightly larger than the open end 11c of the yoke 11.

An inserting portion 32 extends in the axial direction (thicknesswise direction of the base 31) from the axial end of the base 31 facing the yoke 11 in the axial direction. The contour of the inserting portion 32 is slightly smaller than the inner circumferential surface of the side wall 11a. The brush holder 21 is coupled to the yoke 11 with the inserting portion 32 fitted into the yoke 11 from the open end 11c of the yoke 11. The holder main body 22 closes the open end 11c of the yoke 11. A seal member 51, which is formed from elastomer, is arranged on the rim of the base 31. The seal member 51 has a U-shaped cross-section to axially sandwich the rim of the base 31. The seal member 51 is held between the flange 11d of the yoke 11 and the gear housing 71 in the axial direction. The seal, member 51 seals (impervious to liquid) the space between the brush holder 21 and the flange 11d. The seal member 51 also seals a space between the brush holder 21 and the rim of an opening in the gear housing 71 near the yoke 11. The seal member 51 limits the entrance of liquid into the yoke 11 and the gear housing 71.

Figure 4:
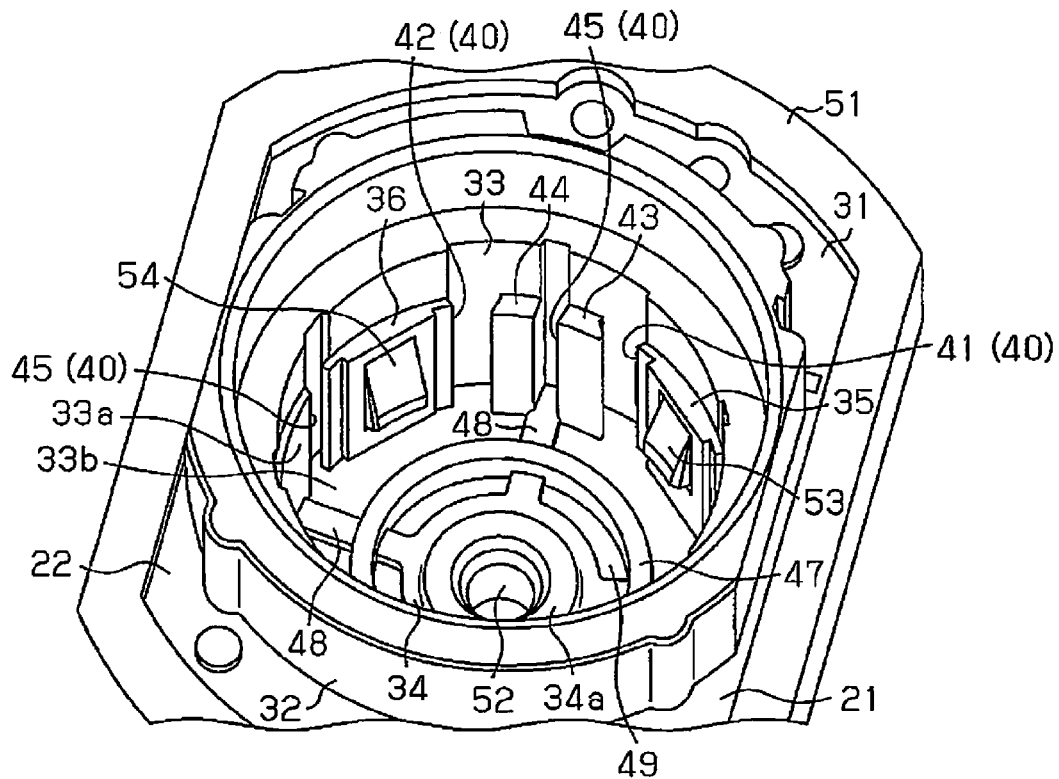
FIG. 4 is a perspective view of a brush holder shown in FIG. 3.

As shown in FIGS. 3 and 4, a cover 33 is arranged on the central portion of the base 31. The cover 33 projects from the base 31 in the axial direction (thicknesswise direction of the base 31, i.e., axial direction of the rotation shaft 14) opposite to the inserting portion 32. The cover 33 includes a cylindrical circumferential wall 33a, which extends from the base 31 opposite to the inserting portion 32 in the axial direction, and an opposing portion 33b, which closes the distal end of the circumferential wall 33a. The cover 33 is cylindrical, includes an open end, and is open toward the inserting portion 32, that is, toward the inner side of the yoke 11. The circumferential wall 33a has an inner diameter that is slightly larger than the outer diameter of the commutator 17. The opposing portion 33b is disk-shaped.

Figure 5:
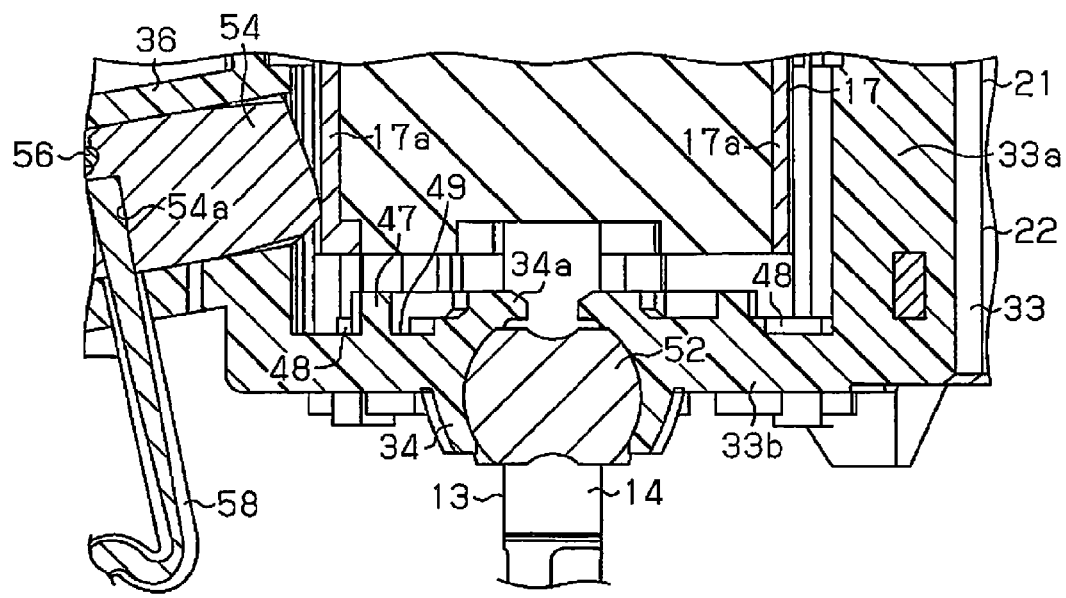
FIG. 5 is a cross-sectional view of the motor unit shown in FIG. 2.

As shown in FIGS. 3, 4, and 5, a central portion of the opposing portion 33b in the radial direction forms a bearing holder 34. The bearing holder 34 is cylindrical and projects from the two opposite sides of the opposing portion 33b in the thickness direction. One axial end of the bearing holder 34 is located in the cover 33. The one axial end of the bearing holder 34 includes an annular covering portion 34a projecting toward the inner side in the radial direction. The covering portion 34a has an inner diameter that is slightly larger than the outer diameter of the rotation shaft 14. A bearing 52 is arranged at the radially inner side of the bearing holder 34. The bearing 52 is press-fitted to the bearing holder 34 from an outer open end of the cover 33. The bearing holder 34 holds the bearing 52. The surface at the axial end of the bearing 52 toward the inner side of the cover 33 is opposed to and covered by the covering portion 34a in the axial direction. The bearing 52 has a smaller outer diameter than the commutator 17. Further, the bearing 52 of the present embodiment is an oil-containing bearing and lubricating oil is impregnated in the bearing 52.

Referring to FIGS. 2, 3, and 5, when the brush holder 21 is attached to the open end 11c of the yoke 11, the commutator 17 is arranged in the cover 33. The circumferential wall 33a covers the outer circumference of the commutator 17 and radially faces the commutator 17. Further, the opposing portion 33b faces one axial end face of the commutator 17, which is the lower end face of the commutator 17 as viewed in FIG. 3 and farther in the axial direction distant from the yoke 11. The bearing 52, which is held by the bearing holder 34, rotatably supports the portion of the rotation shaft 14 at the distal side of the commutator 17 that extends through the opposing portion 33b and out of the cover 33.

Figure 6:
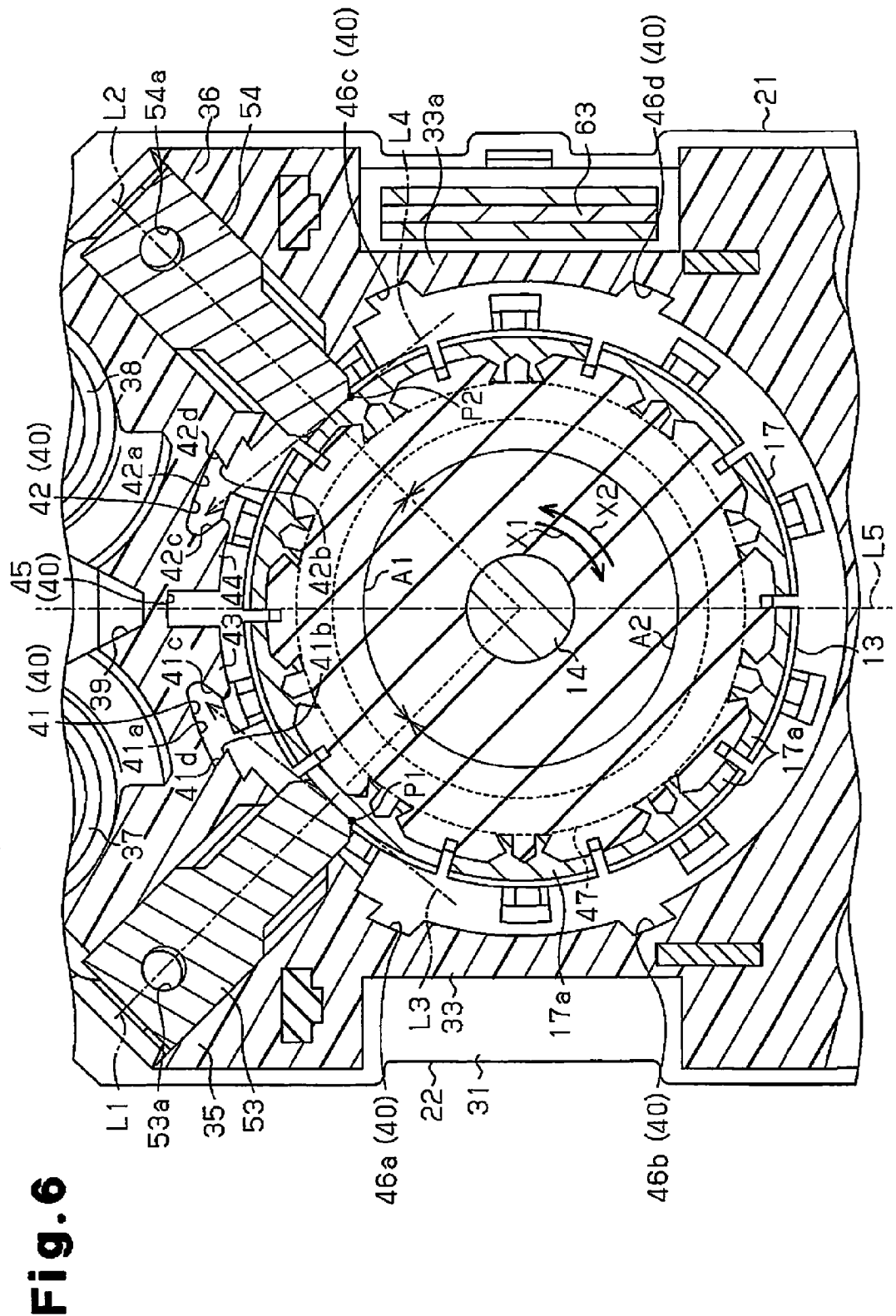
FIG. 6 is a cross-sectional view of the motor unit shown in FIG. 2.

As shown in FIGS. 3 and 6, two brush boxes, namely, a first brush box 35 and a second brush box 36, are arranged integrally with the base 31. The first brush box 35 and the second brush box 36 have similar shapes and extend toward the outer side in the radial direction from the circumferential wall 33a of the cover 33. The first brush box 35 and the second brush box 36 are box-shaped and extend in the radial direction of the cover 33. As shown in FIGS. 4 and 6, in the present embodiment, the first brush box 35 and the second brush box 36 are separated by an interval of 90° in the circumferential direction in the cover 33. As shown in FIGS. 4 and 6, the first brush box 35 and the second brush box 36 are formed integrally with the circumferential wall 33a of the cover 33. The radially inner ends of the first brush box 35 and the second brush box 36 are slightly projected toward the inner side of the cover 33 from the inner circumferential surface of the circumferential wall 33a. Further, the first brush box 35 and the second brush box 36 are open to the inner side of the cover 33. The open ends at the radially inner side of the first brush box 35 and the second brush box 36 are square. The open end at the radially inner side of the first brush box 35 and the open end at the radially inner side of the second brush box 36 are arranged at the same level in the axial direction.

A first power supply brush 53 is accommodated in the first brush box 35, and a second power supply brush 54 is accommodated in the second brush box 36. In other words, the motor 1 includes two power supply brushes 53 and 54. The first power supply brush 53 and the second power supply brush 54 each have the shape of a square post. The first brush box 35 holds the first power supply brush 53 in a manner movable in the radial direction, and the second brush box 36 holds the second power supply brush 54 in a manner movable in the radial direction. The first power supply brush 53 and the second power supply brush 54 are held by the first brush box 35 and the second brush box 36, which are separated by an interval of 90° in the circumferential direction. The first power supply brush 53 and the second power supply brush 54 are separated by an interval of 90° in the circumferential direction at the radially outer side of the commutator 17. The distal end of the first power supply brush 53 (end on the radially inner side) projects into the cover 33 from the open end at the radially inner side of the first brush box 35, and the distal end of the second power supply brush 54 (end on the radially inner side) projects into the cover 33 from the open end at the radially inner side of the second brush box 36.

As shown in FIGS. 3 and 6, a first support rod 37 and a second support rod 38 are arranged in the base 31 at positions within an angular range A1 of 90° between the first brush box 35 and the second brush box 36. The first support rod 37, which is located in the vicinity of the first brush box 35, is cylindrical and extends in the axial direction from the base 31. The second support rod 38, which is located in the vicinity of the second brush box 36, is cylindrical and extends in the axial direction from the base 31. A first torsion spring 55 is fitted on the first support rod 37, and a second torsion spring 56 is fitted on the second support rod 38.

The outer circumferential surface of the circumferential wall 33a of the cover 33 includes an engagement recess 39 located between the first support rod 37 and the second support rod 38. The engagement recess 39 is groove-shaped, opens toward the radially outer side, and extends in the axial direction.

The first torsion spring 55 includes one end inserted into and engaged with the engagement recess 39 and another end inserted into the first brush box 35 from the radially outer end of the first brush box 35. The first torsion spring 55 biases the rear end (radially outer end) of the first power supply brush 53 toward the radially inner side.

The second torsion spring 56 includes one end inserted into and engaged with the engagement recess 39 and another end inserted into the second brush box 36 from the radially outer end of the second brush box 36. The second torsion spring 56 biases the rear end (radially outer end) of the second power supply brush 54 toward the radially inner side.

The first torsion spring 55 biases and pushes the distal end of the first power supply brush 53 toward the radially inner side and against the outer circumferential surface (outer circumferential surface formed by segments 17a) of the commutator 17, which is arranged in the cover 33, to contact the commutator 17 in a slidable manner. In the same manner, the second torsion spring 56 biases and pushes the distal end of the second power supply brush 54 toward the radially inner side and against the outer circumferential surface (outer circumferential surface formed by segments 17a) of the commutator 17, which is arranged in the cover 33, to contact the commutator 17 in a slidable manner.

As shown in FIGS. 3 and 5, the rear end of the first power supply brush 53 includes a connecting hole 53a that opens to the side opposite to the base 31. The connecting hole 53a receives one end of a first pigtail 57, which is formed by a conductive wire. This electrically connects the first power supply brush 53 and the first pigtail 57. In the same manner, the rear end of the second power supply brush 54 includes a connecting hole 54a that opens to the side opposite to the base 31. The connecting hole 54a receives one end of a second pigtail 58, which is formed by a conductive wire. This electrically connects the second power supply brush 54 and the second pigtail 58. The first pigtail 57 extends out of the first brush box 35, and the second pigtail 58 extends out of the second brush box 36.

Figure 7:
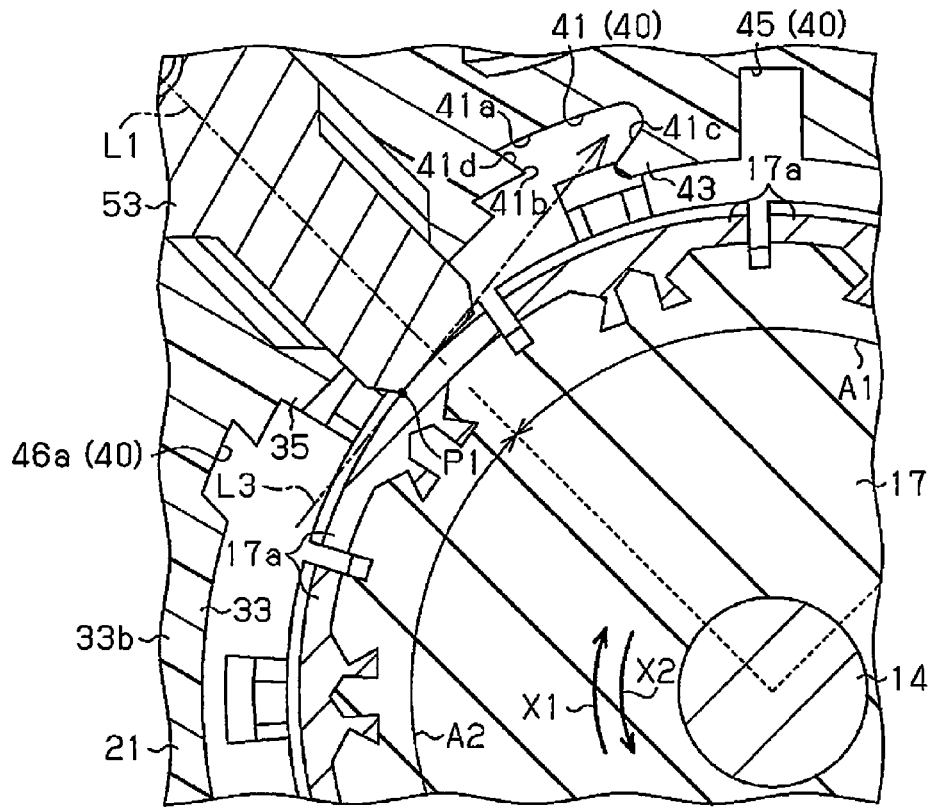
FIG. 7 is a partially enlarged cross-sectional view of the motor unit shown in FIG. 6.

The portion of the first power supply brush 53 that contacts the commutator 17 will now be described with reference to FIG. 7. In FIG. 7, a center line L1 of the first power supply brush 53 is shown by a double-dashed line. The center line L1 of the first power supply brush 53 extends through the circumferentially middle part of the first power supply brush 53 (circumferential direction is the same as the circumferential direction of the commutator 17) from the distal end to the rear end of the first power supply brush 53. When the commutator 17 is rotated in the clockwise direction (arrow X1) as viewed in FIG. 7, the distal end of the first power supply brush 53 comes into contact with the outer circumferential surface of the commutator 17 at a position separated in the circumferential direction from the center line L1 of the first power supply brush 53 as viewed in the axial direction of the rotation shaft 14. In other words, when the commutator 17 is rotated in the clockwise direction in FIG. 7, the contact point P1 between the commutator 17 and the first power supply brush 53 is shifted in the circumferential direction from the center line L1 of the first power supply brush 53. More specifically, the contact point P1 between the commutator 17 and the first power supply brush 53 is located behind the center line L1 of the first power supply brush 53 in the rotating direction of the commutator 17 (toward the lower side of the center line L1 in FIG. 7).

When the commutator 17 is rotated in the counterclockwise direction (arrow X2) in FIG. 7, the contact point between the commutator 17 and the first power supply brush 53 is shifted in the circumferential direction from the center line L1 of the first power supply brush 53. More specifically, when the commutator 17 is rotated in the counterclockwise direction as viewed in FIG. 7, the contact point between the commutator 17 and the first power supply brush 53 is located behind the center line L1 of the first power supply brush 53 in the rotating direction of the commutator 17 (toward the upper side of the center line L1 in FIG. 7).

Referring to FIG. 6, the same applies to the contact point between the commutator 17 and the second power supply brush 54. In FIG. 6, a center line L2 of the second power supply brush 54 is shown by a double-dashed line. The center line L2 of the second power supply brush 54 extends through the middle part, in the width direction, of the second power supply brush 54 (widthwise direction is the same as the circumferential direction of the commutator 17) and extends from the distal end to the rear end of the second power supply brush 54. When the commutator 17 is rotated in the counterclockwise direction (arrow X2) in FIG. 6, the distal end of the second power supply brush 54 contacts the outer circumferential surface of the commutator 17 at a position shifted in the circumferential direction from the center line L2 of the second power supply brush 54 as viewed in the axial direction of the rotation shaft 14. In other words, when the commutator 17 is rotated in the counterclockwise direction as viewed in FIG. 6, the contact point P2 between the commutator 17 and the second power supply brush 54 is shifted in the circumferential direction from the center line L2 of the second power supply brush 54. More specifically, the contact point P2 between the commutator 17 and the second power supply brush 54 is located behind the center line L2 of the second power supply brush 54 in the rotating direction of the commutator 17 (toward the lower side of the center line L2 in FIG. 6).

When the commutator 17 is rotated in the clockwise direction (see arrow X1) in FIG. 6, the contact point between the commutator 17 and the second power supply brush 54 is shifted in the circumferential direction from the center line L2 of the second power supply brush 54. More specifically, when the commutator 17 is rotated in the clockwise direction as viewed in FIG. 6, the contact point between the commutator 17 and the second power supply brush 54 is located behind the center line L2 of the second power supply brush 54 in the rotating direction of the commutator 17 (toward the upper side of the center line L2 in FIG. 6).

As shown in FIGS. 4 and 6, the holder main body 22 includes a collecting recess 40 having an open end. The open end of the collecting recess 40 is located at the radially outer side of the commutator 17 and faces the outer circumferential surface of the commutator 17 (outer circumferential surface formed by segments 17*a*). The present embodiment includes a plurality of collecting recess 40 in the inner circumferential surface of the circumferential wall 33*a* of the cover 33.

Two of the collecting recesses 40 are arranged in the angular range A1 of 90° between the first brush box 35 and the second brush box 36. The two collecting recesses 40 are a first tangential collecting recess 41 and a second tangential collecting recess 42. The first power supply brush 53 and the second power supply brush 54 are arranged in an interval of 90° in the circumferential direction at the radially outer side of the commutator 17 and held by the first brush box 35 and the second brush box 36, which are arranged at an interval of 90° in the circumferential direction. Thus, in the same manner as the first brush box 35 and the second brush box 36, the first power supply brush 53 and the second power supply brush 54 are also arranged in the angular range A1 of 90°. In other words, the angular range A1 of 90° between the first brush box 35 and the second brush box 36 is the angular range A1 of 90° between the first power supply brush 53 and the second power supply brush 54.

As shown in FIG. 7, the first tangential collecting recess 41 is arranged in the inner circumferential surface of the circumferential wall 33*a* at a position including a first tangent L3 of the outer circumferential surface of the commutator 17 at the contact point P1 between the first power supply brush 53 and the commutator 17 when the commutator 17 is rotated in the clockwise direction (direction of the arrow X1) as viewed in FIG. 7. Further, the first tangential collecting recess 41 is arranged at a position including the first tangent L3 and located ahead of the commutator 17 in the rotating direction of the commutator 17 that rotates in the clockwise direction, which is one of the two circumferential directions of the first power supply brush 53. As shown in FIGS. 4 and 7, the first tangential collecting recess 41 is groove-shaped, opens toward the radially inner side, and extends along the axial direction. In the present embodiment, the first tangential collecting recess 41 is formed by the circumferential wall 33*a*, the radially inner end of the first brush box 35 projecting toward the inner side from the circumferential wall 33*a*, and a first collecting projection 43 arranged at a position laterally separated from the radially inner end of the first brush box 35 and projecting toward the radially inner side from the circumferential wall 33*a*.

The first collecting projection 43 is arranged at a position within the angular range A1 in the inner circumferential surface of the circumferential wall 33*a*. Further, the first collecting projection 43 is formed at a position located ahead of the radially inner end of the first brush box 35 in the rotating direction of the commutator 17 that rotates in the clockwise direction. The first collecting projection 43 is spaced apart in the circumferential direction from the radially inner end of the first brush box 35. The first collecting projection 43 has a protrusion extending in the axial direction from the inner surface of the opposing portion 33*b* to the vicinity of the open end of the cover 33.

The first tangential collecting recess 41 is groove-shaped and surrounded by the radially inner end of the first brush box 35 projecting toward the inner side from the circumferential wall 33*a*, the first collecting projection 43, and the inner circumferential surface of the circumferential wall 33*a*. The first tangential collecting recess 41 is longer in the axial direction than the open end at the radially inner side of the first brush box 35. The first tangential collecting recess 41 includes one axial end (end closer to the opposing portion 33*b*) located at a position closer to the opposing portion 33*b* than the axial end in the radially inner open end of the first brush box 35 (end closer to the opposing portion 33*b*). Further, the first tangential collecting recess 41 includes another axial end (end closer to the open end of the cover 33) located at a position closer to the open end of the cover 33 than the other axial end in the radially inner open end of the first brush box 35 (end closer to the open end of the cover 33). In other words, the radially inner open end of the first brush box 35 is formed at a position located within the range the first tangential collecting recess 41 is formed in the axial direction.

The first tangential collecting recess 41 is narrower than the radially inner open end of the first brush box 35 in the circumferential direction. In the first tangential collecting recess 41, the circumferential width decreases from the bottom surface 41*a* toward the open end 41*b* at the radially inner side. Accordingly, the first tangential collecting recess 41 is trapezoidal in which the cross-section taken along a direction orthogonal to the axial direction has a circumferential width that decreases toward the radially inner side. The first tangential collecting recess 41 includes inner side surfaces 41*c* and 41*d* located at the two circumferential sides of the first tangential collecting recess 41. The inner side surface 41*c* is farther from the first brush box 35 than the inner side surface 41*d* and formed by the first collecting projection 43. The inner side surface 41*c* extends parallel to the first tangent L3 and the axial direction (axial direction of the cover 33, same as the axial direction of the rotation shaft 14). Further, the inner side surface 41*c* extends toward the radially inner side for a longer distance than the inner side surface 41*d* formed by the first brush box 35.

As shown in FIGS. 4 and 6, the second tangential collecting recess 42 is arranged in the inner circumferential surface of the circumferential wall 33*a* at a position including a second tangent L4 of the outer circumferential surface of the commutator 17 at the contact point P2 between the second power supply brush 54 and the commutator 17 when the commutator 17 is rotated in the counterclockwise direction (direction of arrow X2) as viewed in FIG. 6. Further, the second tangential collecting recess 42 is arranged at a position including the second tangent L4 and located ahead of the commutator 17 that rotates in the counterclockwise direction, which is one of the two circumferential directions of the second power supply brush 54. Like the first tangential collecting recess 41, the second tangential collecting recess 42 is groove shaped, opens toward the radially inner side, and extends along the axial direction. In the present embodiment, the second tangential collecting recess 42 is formed by the circumferential wall 33*a*, the radially inner end of the second brush box 36 projecting toward the inner side from the circumferential wall 33*a*, and a second collecting projection 44 arranged at a position laterally separated from the radially inner end of the second brush box 36 and projecting toward the radially inner side from the circumferential wall 33*a*.

The second collecting projection 44 is arranged at a position within the angular range A1 in the inner circumferential surface of the circumferential wall 33*a*. Further, the second collecting projection 44 is formed at a position located ahead of the radially inner end of the second brush box 36 in the rotating direction of the commutator 17 that rotates in the counterclockwise direction. The second collecting projection 44 is spaced apart in the circumferential direction from the radially inner end of the second brush box 36. The second collecting projection 44 has a protrusion extending in the axial direction from the inner surface of the opposing portion 33*b* to the vicinity of the open end of the cover 33.

The second tangential collecting recess 42 is a groove-shaped and surrounded by the radially inner end of the second brush box 36 projecting toward the inner side from the circumferential wall 33a, the second collecting projection 44, and the inner circumferential surface of the circumferential wall 33a. The axial length of the second tangential collecting recess 42 is longer in the axial direction than the open end at the radially inner side of the second brush box 36. The second tangential collecting recess 42 includes one axial end (end closer to the opposing portion 33b) located at a position closer to the opposing portion 33b than the axial end in the radially inner open end of the second brush box 36 (end closer to the opposing portion 33b). Further, the second tangential collecting recess 42 includes another axial end (end closer to the open end of the cover 33) located at a position closer to the open end of the cover 33 than the other axial end in the radially inner open end of the second brush box 36 (end closer to the open end of the cover 33). In other words, the radially inner open end of the second brush box 36 is formed at a position located within the range the second tangential collecting recess 42 is formed in the axial direction.

The second tangential collecting recess 42 is narrower than the radially inner open end of the second brush box 36 in the circumferential direction. In the second tangential collecting recess 42, the circumferential width decreases from the bottom surface 42a toward the open end 42b at the radially inner side. Accordingly, the second tangential collecting recess 42 is trapezoidal in which the cross-section taken along a direction orthogonal to the axial direction has a circumferential width that decreases toward the radially inner side. The second tangential collecting recess 42 includes inner side surfaces 42c and 42d located at the two circumferential sides of the second tangential collecting recess 42. The inner side surface 42c is farther from the second brush box 36 than the inner side surface 42d and formed by the second collecting projection 44. The inner side surface 42c extends parallel to the second tangent L4 and the axial direction (axial direction of the cover 33, same as the axial direction of the rotation shaft 14). Further, the inner side surface 42c extends toward the radially inner side for a longer distance than the inner side surface 42d formed by the second brush box 36.

One of the collecting recesses 40 arranged between the first tangential collecting recess 41 and the second tangential collecting recess 42 defines an auxiliary collecting recess 45. The auxiliary collecting recess 45 is arranged at a central part in the circumferential direction between the first tangential collecting recess 41 and the second tangential collecting recess 42 within the angular range A1 of 90° between the first brush box 35 and the second brush box 36 in the inner circumferential surface of the circumferential wall 33a. In the present embodiment, the auxiliary collecting recess 45 is formed by the circumferential wall 33a, the first collecting projection 43, and the second collecting projection 44. The auxiliary collecting recess 45 is arranged between the first collecting projection 43 and the second collecting projection 44. The auxiliary collecting recess 45 is located in the circumferential wall 33a between the first collecting projection 43 and the second collecting projection 44.

The inner circumferential surface of the circumferential wall 33a is recessed toward the radially outer side to form the auxiliary collecting recess 45 that extends in the radial direction. The auxiliary collecting recess 45 is groove-shapes, opens toward the radially inner side, and extends in the axial direction. The auxiliary collecting recess 45 is longer in the axial direction than the radially inner open end of the first brush box 35. The auxiliary collecting recess 45 includes an axial end (end closer to the opposing portion 33b) located at a position closer to the opposing portion 33b than the axial end (end closer to the opposing portion 33b) in the radially inner open end of the first brush box 35. Further, the auxiliary collecting recess 45 includes another axial end (end closer to the open end of the cover 33) located at a position closer to the open end of the cover 33 than the other axial end in the radially inner open end of the first brush box 35 (end closer to the open end of the cover 33). The auxiliary collecting recess 45 is narrower in the circumferential direction than the radially inner open end of the first brush box 35. In the present embodiment, the auxiliary collecting recess 45 has a U-shaped cross-section in the direction orthogonal to the axial direction. The U-shaped cross-section opens toward the radially inner side.

As shown in FIGS. 4 and 6, four of the collecting recesses 40 are arranged within an angular range A2 of 27° between the first brush box 35 and the second brush box 36. The four collecting recesses 40 define four simple collecting recesses 46a to 46d. The first power supply brush 53 and second power supply brush 54, which are held by the first brush box 35 and the second brush box 36, are spaced apart by an interval of 90° in the circumferential direction at the radially outer side of the commutator 17. Accordingly, the angular range A2 of 270° between the first brush box 35 and the second brush box 36 corresponds to the angular range A2 of 270° between the first power supply brush 53 and the second power supply brush 54.

Each of the simple collecting recesses 46a to 46d is arranged in the inner circumferential surface of the circumferential wall 33a and groove-shaped to open toward the radially inner side and extend in the axial direction. Each of the simple collecting recesses 46a to 46d is longer in the axial direction than the radially inner open end of the first brush box 35. Each of the simple collecting recesses 46a to 46d includes one axial end (end closer to the opposing portion 33b) located at a position closer to the opposing portion 33b than the other axial end (end closer to the opposing portion 33b) in the radially inner open end of the first brush box 35. Further, each of the simple collecting recesses 46a to 46d includes another axial end in the axial direction (end closer to the open end of the cover 33) located at a position closer to the open end of the cover 33 than the other axial end in the radially inner open end of the first brush box 35 (end closer to the open end of the cover 33). The simple collecting recesses 46a to 46d are narrower than the radially inner open end of the first brush box 35 in the circumferential direction. Each of the simple collecting recesses 46a to 46d has a substantially U-shaped cross-section in a direction orthogonal to the axial direction in the present embodiment. The substantially U-shaped cross-section opens toward the radially inner side.

The two simple collecting recesses 46a and 46b among the four simple collecting recesses 46 are formed at positions closer to the first brush box 35 than line L5 when viewing the brush holder 21 from the axial direction. In other words, the interval from the simple collecting recesses 46a and 46b to the first brush box 35 is shorter than the interval from the simple collecting recesses 46a and 46b to the line L5. The line L5 extends in the radial direction of the cover 33 through a circumferential middle location between the first brush box 35 and the second brush box 36 and the radially middle location of the cover 33 (rotation axis of the rotation shaft 14). The remaining simple collecting recesses 46c and 46d are formed at locations closer to the second brush box 36 than the line L5. In other words, the interval from the simple collecting recesses 46c and 46d to the second brush box 36 is shorter than the interval from the simple collecting recesses 46c and 46d to the line L5. Further, the two simple collecting recesses 46a and 46b, formed at locations closer to the first brush box 35 in the inner circumferential surface of the circumferential wall 33a, and the two simple collecting recesses 46c and 46d, formed at locations closer to the second brush box 36 in the inner circumferential surface of the circumferential wall 33a, are located at symmetric positions to the line L5, which serves as a symmetrical axis, when viewing the brush holder 21 from the axial direction.

The simple collecting recess 46a is adjacent to the first brush box 35 in the circumferential direction. The simple collecting recess 46b is formed between the line L5 and the first brush box 35 and is adjacent in the circumferential direction to the line L5. The interval in the circumferential direction between the simple collecting recess 46a and the first brush box 35 is substantially equal to the interval in the circumferential direction between the first brush box 35 and the first tangential collecting recess 41. Further, the interval in the circumferential direction between the simple collecting recess 46b and the line L5 is substantially equal to the interval in the circumferential direction between the simple collecting recess 46b and the first brush box 35. The simple collecting recess 46a includes two inner side surfaces in the circumferential direction. The two inner side surfaces are substantially parallel to the two inner side surfaces forming the opening of the first brush box 35. Further, the simple collecting recess 46b includes two inner side surfaces in the circumferential direction. The two inner side surfaces extend at a substantially right angle to the two inner side surfaces forming the opening of the first brush box 35.

In the same manner, the collecting recess 46c is adjacent in the circumferential direction to the second brush box 36. The simple collecting recess 46d is formed between the line L5 and the second brush box 36 and is adjacent in the circumferential direction to the line L5. The interval in the circumferential direction between the simple collecting recess 46c and the second brush box 36 is substantially equal to the interval in the circumferential direction between the second brush box 36 and the second tangential collecting recess 42. Further, the interval in the circumferential direction between the simple collecting recess 46d and the line L5 is substantially equal to the interval in the circumferential direction between the simple collecting recess 46d and the second brush box 36. The simple collecting recess 46c includes two inner side surfaces located at two sides in the circumferential direction of the simple collecting recess 46c. The two inner side surfaces are substantially parallel to the two inner side surfaces forming the opening of the second brush box 36. Further, the simple collecting recess 46d includes two inner side surfaces located at two circumferential sides in the direction of the collecting recess 46d. The two inner side surfaces extend at a substantially right angle to the two inner side surfaces forming the opening of the second brush box 36.

Figure 8:
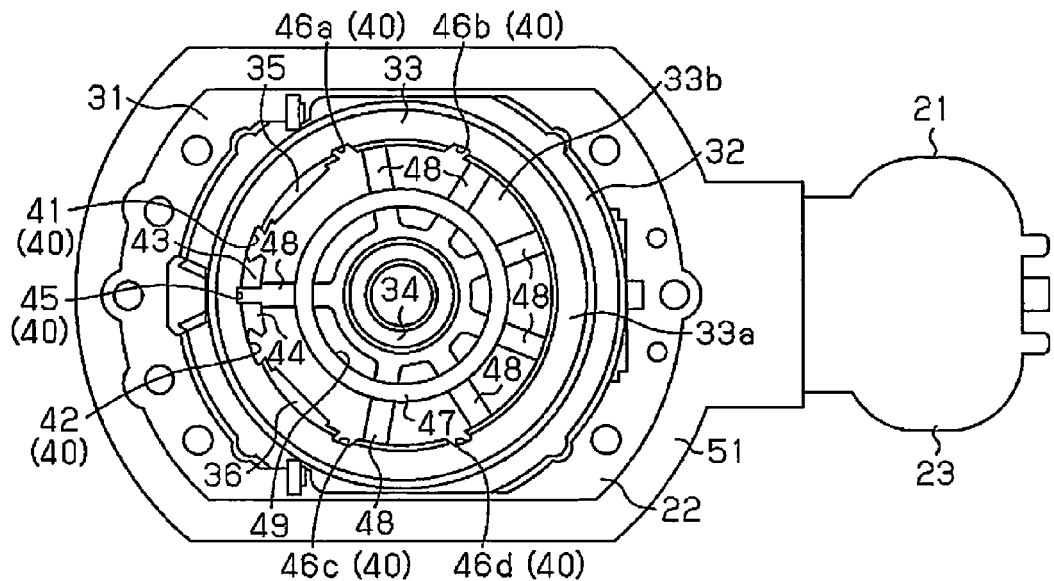
FIG. 8 is a plan view of the brush holder shown in FIG. 4.

As shown in FIGS. 4, 5, and 8, a first diffusion restriction projection 47 (annular portion) serving as a diffusion stopper is arranged on the opposing portion 33b of the cover 33. The first diffusion restriction projection 47 is arranged on the inner surface of the opposing portion 33b (i.e., side surface inside the cover 33 in the opposing portion 33b). The first diffusion restriction projection 47 includes a protrusion that axially projects from the inner surface of the opposing portion 33b and extends the circumferential direction of the cover 33. Further, the first diffusion restriction projection 47 is annular and concentric with the circumferential wall 33a and the bearing holder 34. The annular first diffusion restriction projection 47 surrounds the rotation shaft 14. The first diffusion restriction projection 47 is located at a substantially middle position in the radial direction between the circumferential wall 33a and the bearing holder 34. The first diffusion restriction projection 47 has a smaller outer diameter than the commutator 17 (FIGS. 5 and 6). That is, the first diffusion restriction projection 47 is located toward the radially inner side from the outer circumferential surface of the commutator 17 as viewed in the axial direction. Further, the first diffusion restriction projection 47 has an axial height that is about one-half of the gap in the axial direction between the commutator 17 arranged at the inner side of the cover 33 and the opposing portion 33b in the present embodiment.

A plurality of (seven in the present embodiment) second diffusion restriction projections 48 (radial portions) serving as a diffusion stopper is arranged on the opposing portion 33b. Each of the second diffusion restriction projections 48 is arranged on the inner surface of the opposing portion 33b like the first diffusion restriction projection 47. The second diffusion restriction projections 48 extend in the radial direction from the bearing holder 34. In other words, the second diffusion restriction projections 48 are arranged on the radially outer side of the rotation shaft 14 and extend in the radial direction. Each of the second diffusion restriction projections 48 has a protrusion that extends along the radial direction from the outer circumferential surface of the bearing holder 34 to the inner circumferential surface of the circumferential wall 33a. Adjacent ones of the second diffusion restriction projections 48 in the circumferential direction are spaced apart in the circumferential direction. In the present embodiment, the height of the second diffusion restriction projection 48 is set to be lower than the height of the first diffusion restriction projection 47 in the axial direction. The second diffusion restriction projection 48 has an axial height that is about one fourth of the gap in the axial direction between the commutator 17, which is arranged at the inner side of the cover 33, and the opposing portion 33b.

The first diffusion restriction projection 47 and the bearing holder 34 are shaped to project in the axial direction from the inner surface of the opposing portion 33b. A diffusion restriction recess 49, serving as a diffusion stopper recessed in the axial direction, is formed between the first diffusion restriction projection 47 and the bearing holder 34 in the radial direction. The diffusion restriction recess 49 is divided into segments in the circumferential direction by the second diffusion restriction projection 48 projecting in the axial direction from the inner surface of the opposing portion 33b. Each of the diffusion restriction recesses 49 is arcuate and extends about the rotation shaft 14.

As shown in FIG. 3, a first terminal 61 is fixed to the holder main body 22. The first terminal 61 is arranged on the radially outer side of the cover 33 between the first brush box 35 and the connector unit 23. A second terminal 62 is fixed to the holder main body 22. The second terminal 62 is arranged at the radially outer side of the cover 33 between the second brush box 36 and the connector unit 23. The first terminal 61 and the second terminal 62 are formed by pressing a conductive metal plate. The other end of the first pigtail 57 (i.e., end opposite to the end connected to the first power supply brush 53 in the first pigtail 57) is connected to the first terminal 61. The other end of the second pigtail 58 (i.e., end opposite to the end connected to the second power supply brush 54 in the second pigtail 58) is connected to the second terminal 62. Further, a positive temperature coefficient (PTC) thermistor 63 used for overcurrent protection is connected to the second terminal 62. A first embedded terminal 64 and a second embedded terminal 65 are embedded in the brush holder 21. A capacitor 66 is connected to the first embedded terminal 64 and the second embedded terminal 65. The capacitor 66 is arranged between the cover 33 and the connector unit 23 in the holder main body 22. The capacitor 66 is a noise preventing element that limits the generation of electromagnetic noise. The first terminal 61 is connected to the first embedded terminal 64, and the second terminal 62 is connected to the second embedded terminal 65.

As shown in FIGS. 1, 2, and 3, the connector unit 23 projects in one direction orthogonal to the axial direction of the rotation shaft 14 from the peripheral surface of the base 31. In the present embodiment, the connector unit 23 projects from the end of the base 31 at the side opposite to the first support rod 37 and the second support rod 38. More specifically, the connector unit 23 projects away from the first support rod 37 and the second support rod 38 in the direction orthogonal to the axial direction of the rotation shaft 14. The distal end of the connector unit 23 includes a tubular socket 23a extending in the axial direction of the rotation shaft 14 opposite to the yoke 11. The first embedded terminal 64 and the second embedded terminal 65 each include an end projecting into the socket 23a and exposed in the socket 23a. When an external connector (not shown) is plugged into the socket 23a, the external connector is connected to the connector unit 23. This electrically connects the first embedded terminal 64 and the second embedded terminal 65 to the external connector. The external connector is electrically connected to a power supply device so that power is supplied to the first embedded terminal 64 and the second embedded terminal 65 through the external connector. Thus, current is supplied to the first power supply brush 53 through the first embedded terminal 64, the first terminal 61, and the first pigtail 57. Further, current is supplied to the second power supply brush 54 through the second embedded terminal 65, the second terminal 62, the PTC thermistor 63, and the second pigtail 58.

As shown in FIG. 2, the speed reduction unit 3 includes the gear housing 71, which forms the shell of the speed reduction unit 3, and a speed reducing mechanism 81, which is accommodated in the gear housing 71.

The gear housing 71 is formed from a synthetic resin. The gear housing 71 includes a fastening portion 72 located at the end near the yoke 11. The yoke 11 is coupled to the fastening portion 72. The fastening portion 72 includes an end near the yoke 11 having an outer shape that substantially conforms to the outer shape of the flange 11d. As shown in FIGS. 1 and 2, the flange 11d comes into contact in the axial with the end face of the fastening portion 72 near the yoke 11. In this state, screws 91 couple and fasten the flange 11d and the fastening portion 72 to each other. The fastening portion 72 receives the portion of the holder main body 22 projecting out of the open end 11c in the yoke 11, the portion of the rotation shaft 14 projecting out of the open end 11c in the yoke 11, the commutator 17, the first power supply brush 53, and the second power supply brush 54.

The gear housing 71 includes a worm shaft retainer 73 extending from the fastening portion 72 in the axial direction toward the side opposite to the yoke 11. The worm shaft retainer 73 is hollow. The interior of the worm shaft retainer 73 is connected to the interior of the fastening portion 72. A worm shaft 82, which forms the speed reducing mechanism 81, is accommodated in the worm shaft retainer 73. The worm shaft 82 is substantially bar-shaped. A threaded worm 82a is formed in the axially central part of the worm shaft 82. The worm shaft 82 is arranged coaxially with the rotation shaft 14 in the worm shaft retainer 73. A clutch 92 couples the basal end of the worm shaft 82 (upper end as viewed in FIG. 2) is coupled to the distal end of the rotation shaft 14. The clutch 92 transmits the rotation force of the rotation shaft 14 to the worm shaft 82. When rotation is input from the worm shaft 82, the clutch 92 generates a braking force to restrict rotation of the clutch 92 and thereby restrict rotation of the worm shaft 82.

The gear housing 71 includes a wheel retainer 74 located beside the worm shaft retainer 73 (left side as viewed in FIG. 2). When viewed from a direction orthogonal to the axial direction of the worm shaft 82, the wheel retainer 74 is substantially disk-shaped and hollow. The interior of the wheel retainer 74 is connected to the interior of the worm shaft retainer 73 at the axially central part of the worm shaft retainer 73. A worm wheel 83, which forms the speed reducing mechanism 81 with the worm shaft 82, is accommodated in the wheel retainer 74.

Figure 9A:
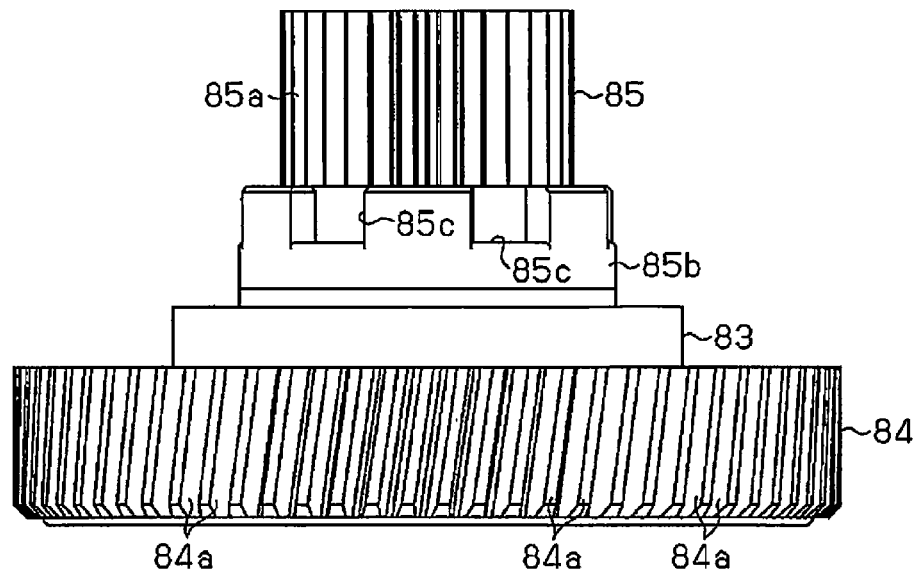
FIG. 9A is a side view of a worm wheel shown in FIG. 2.
Figure 9B:
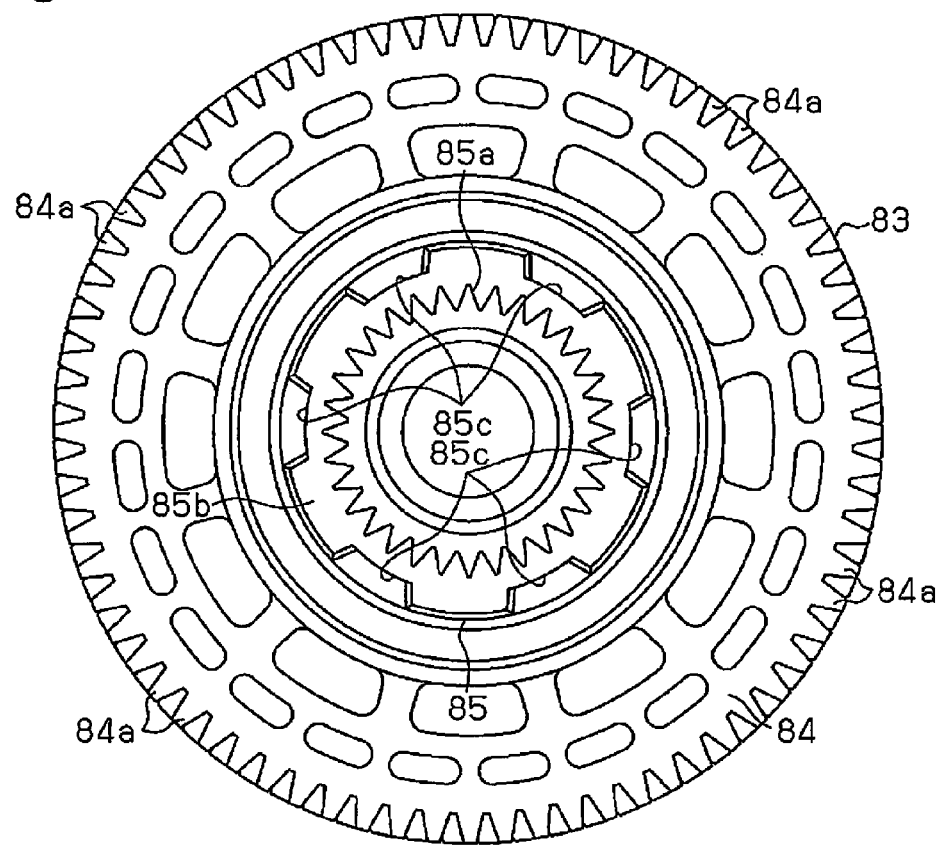
FIG. 9B is a plan view of the worm wheel shown in FIG. 9A.

As shown in FIGS. 9A and 9B, the worm wheel 83 includes a disk-shaped gear portion 84 and a substantially cylindrical output shaft 85 extending to one side in the axial direction from the radially central part of the gear portion 84. The gear portion 84 is a helical gear including teeth 84a on the rim of the gear portion 84. The distal end of the output shaft 85 defines a coupling portion 85a, which is connected to a window regulator that raises and lowers the window glass of a vehicle. The output shaft 85, at the basal side of the coupling portion 85a, defines a testing portion 85b having a larger outer diameter than the coupling portion 85a. Testing recesses 85c are arranged at the edge of the testing portion 85b. In the present embodiment, six testing recesses 85c are arranged at the edge of the testing portion 85b. The six testing recesses 85c are arranged at equal angular intervals (intervals of 60°) in the circumferential direction. Each testing recess 85c is opened in two directions, namely, the radially outer side and the distal side of the output shaft 85. Each testing recess 85c is trapezoidal in shape as viewed in the axial direction and has a circumferential width that increases toward the radially outer side.

As shown in FIGS. 1 and 2, the gear portion 84 of the worm wheel 83 is accommodated in the wheel retainer 74. The output shaft 85 projects out of the gear housing 71 from an output hole 75 in the radially central part of the wheel retainer 74. The testing portion 85b is exposed to the exterior of the gear housing 71. Further, the worm wheel 83 is supported by the wheel retainer 74 such that the gear portion 84 is engaged with the worm 82a of the worm shaft 82 and is rotatable about the output shaft 85.

Figure 10:
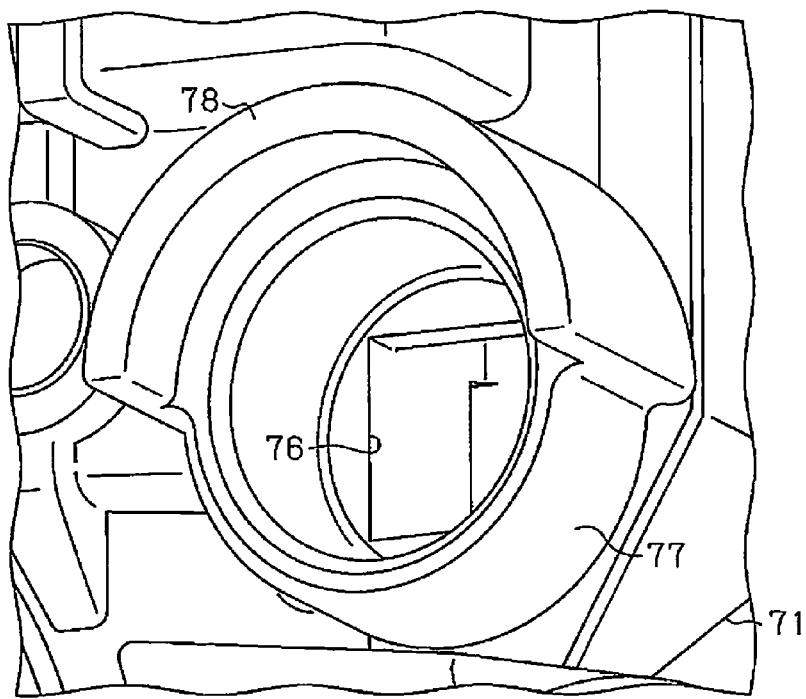
FIG. 10 is a partially enlarged perspective view of a gear housing shown in FIG. 1.

As shown in FIGS. 1 and 10, the gear housing 71 includes a vent 76 located at a position opposite to the wheel retainer 74 beside of the worm shaft retainer 73. The vent 76 communicates the interior and the exterior of the gear housing 71. The vent 76 includes an open end at the outer side of the gear housing 71 opens in the outer surface of the gear housing 71. The vent 76 has a square shape in the present embodiment. Further, the gear housing 71 includes a cylindrical surrounding portion 77, which surrounds the open end of the vent 76 at the outer side of the gear housing 71. The surrounding portion 77 projects out of the gear housing 71 from the outer surface of the gear housing 71. The projecting direction is the same as the axial direction of the output shaft 85. Further, an infiltration restriction flange 78 is formed integrally with the outer circumferential surface of the surrounding portion 77. The infiltration restriction flange 78 extends along about one half of the outer circumferential surface of the surrounding portion 77 in the region closer to the motor unit 2. The infiltration restriction flange 78 is brim-shaped and extends in the projecting direction of the surrounding portion 77 along the outer circumferential surface of the surrounding portion 77. The shape of the infiltration restriction flange 78 as viewed from the projecting direction of the surrounding portion 77 is semicircular and lies along the outer circumferential surface of the surrounding portion 77. The distal end of the infiltration restriction flange 78 is located at a position projecting in the projecting direction of the surrounding portion 77 from the distal end of the surrounding portion 77. The infiltration restriction flange 78 surrounds about one half of the surrounding portion 77 at the region closer to the motor unit 2.

The operation of the motor 1 of the present embodiment will now be described.

In the motor 1, current is supplied to the first embedded terminal 64 and the second embedded terminal 65 through the external connector connected to the connector unit 23. The current is supplied from the first embedded terminal 64 and the second embedded terminal 65 through the first power supply brush 53, the second power supply brush 54, and the commutator 17 to the armature coils 16. This rotates the armature 13, and the rotation of the rotation shaft 14 is transmitted to the worm shaft 82 through the clutch 92. The rotation speed of the worm shaft 82 is reduced by the worm shaft 82 and the worm wheel 83, and the rotation force is output from the output shaft 85. The window glass of the vehicle is lowered or raised by the window regulator coupled to the output shaft 85 in correspondence with the rotating direction of the output shaft 85.

The commutator 17 rotates integrally with the rotation shaft 14. When the rotation shaft 14 rotates, the first power supply brush 53 and the second power supply brush 54 slide along the commutator 17. This wears the first power supply brush 53 and the second power supply brush 54 and produces abrasion powder from the first power supply brush 53 and the second power supply brush 54. The brush holder 21 includes the circumferential wall 33a that radially faces the outer circumferential surface of the commutator 17. Each of the collecting recesses 40 arranged in the circumferential wall 33a has an opening facing the outer circumferential surface of the commutator 17. The abrasion powder of the first power supply brush 53 and the second power supply brush 54 may thus enter the collecting recesses 40. In detail, referring to FIG. 7, when the commutator 17 is rotated in the clockwise direction (direction of the arrow X1) in FIG. 7, the abrasion powder of the first power supply brush 53 is easily diffused toward the front of the contact point P1 between the first power supply brush 53 and the commutator 17 in the rotating direction of the commutator 17, which is the tangential direction of the outer circumferential surface of the commutator 17. Accordingly, the abrasion powder of the first power supply brush 53 efficiently enters the first tangential collecting recess 41. As shown in FIG. 6, when the commutator 17 is rotated in the counterclockwise direction (direction of the arrow X2) in FIG. 6, the abrasion powder of the second power supply brush 54 is easily diffused toward the front of the contact point P2 between the second power supply brush 54 and the commutator 17 in the tangential direction of the outer circumferential surface of the commutator 17. Accordingly, the abrasion powder of the second power supply brush 54 efficiently enters the second tangential collecting recess 42. The auxiliary collecting recess 45 is arranged between the first tangential collecting recess 41 and the second tangential collecting recess 42. At least some of the abrasion powder of the power supply brushes 53 and 54 that did not enter the first tangential collecting recess 41 or the second tangential collecting recess 42 may enter the auxiliary collecting recess 45. In the angular range A2 of 270° between the first power supply brush 53 (first brush box 35) and the second power supply brush 54 (second brush box 36), the abrasion powder of the power supply brushes 53, 54 may enter the simple collecting recess 46.

As shown in FIGS. 5 and 8, the first diffusion restriction projection 47 and the second diffusion restriction projection 48 limits the diffusion of the abrasion powder of the power supply brushes 53 and 54 at the gap between the commutator 17 and the opposing portion 33b. The first diffusion restriction projection 47 limits diffusion of the abrasion powder of the power supply brushes 53 and 54 from the power supply brushes 53 and 54 toward the rotation shaft 14 at the gap between the commutator 17 and the opposing portion 33b. The second diffusion restriction projection 48 limits diffusion of abrasion powder from the first power supply brush 53 toward the second power supply brush 54, and the diffusion of abrasion powder from the second power supply brush 54 toward the first power supply brush 53 at the gap between the commutator 17 and the opposing portion 33b. The bearing holder 34 projects in the axial direction from the inner surface of the opposing portion 33b. However, it is difficult to limit the diffusion of the abrasion powder of the power supply brushes 53 and 54 with the bearing holder 34.

Figure 11A:
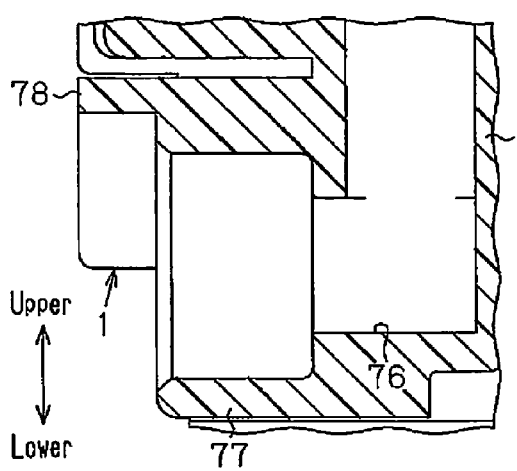
FIGS. 11A and 11B are partially enlarged cross-sectional views of the gear housing shown in FIG. 10.
Figure 11B:
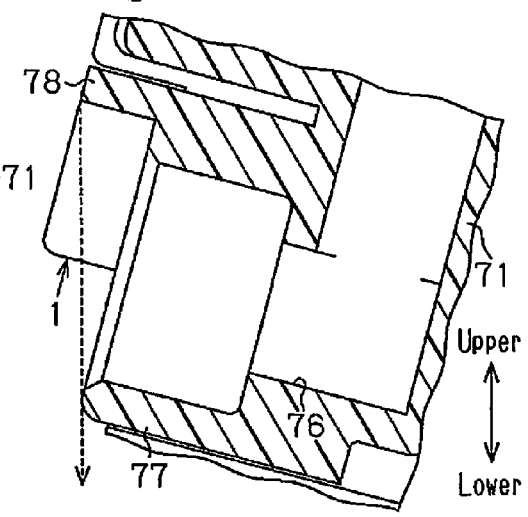

As shown in FIG. 10, the infiltration restriction flange 78 is arranged near the vent 76. The infiltration restriction flange 78 projects out of the gear housing 71 from the tubular surrounding portion 77. The surrounding portion 77 surrounds the open end of the vent 76 at the outer side of the gear housing 71. The infiltration restriction flange 78 limits the entrance of liquid into the surrounding portion 77. For example, as shown in FIGS. 1 and 11A, the motor 1 is mounted on the vehicle so that the motor unit 2 is located at the upper side and the speed reduction unit 3 is located at the lower side, and the projecting direction of the surrounding portion 77 is orthogonal to the vertical direction. In such a case, the liquid falling from the upper side is blocked by the infiltration restriction flange 78 and is less likely to enter the surrounding portion 77. This limits entrance of liquid into the vent 76. Further, as shown in FIGS. 1 and 11B, the motor 1 may be mounted on the vehicle so that the motor unit 2 is located at the upper side of the speed reduction unit 3 and so that the distal end of the surrounding portion 77 is slightly directed upward. For example, the motor 1 may be mounted while being inclined relative to the vertical direction of the vehicle. In the example shown in FIG. 11B, the lower end in the distal end face of the surrounding portion 77 is located at the position that is not projected from the infiltration restriction flange 78, which is located above the lower end. In this case, liquid falls from the distal end of the infiltration restriction flange 78 as shown by the broken line arrow. Thus, the infiltration restriction flange 78 limits the entrance of liquid into the surrounding portion 77. Accordingly, the entrance of liquid into the vent 76 is limited.

As shown in FIGS. 1, 9A, and 9B, the testing recesses 85c arranged in the worm wheel 83 are located at the basal side of the output shaft 85. To test the operation performance of the window glass when raising and lowering the window glass, a testing jig is attached to the testing recesses 85c to apply load to the worm wheel 83. The testing recess 85c is arranged at a position separated from the coupling portion 85a to which the window regulator is coupled. Thus, even when the shape of the coupling portion 85a is changed in the worm wheel 83, the operation performance can be tested using the same testing jig as long as the testing recesses 85c are arranged in the worm wheel 83.

The present embodiment has the following advantages.

(1) When the first power supply brush 53 and the second power supply brush 54 slide along the outer circumferential surface of the rotating commutator 17, the power supply brushes 53 and 54 produce abrasion powder. The collecting recesses 40 allow the abrasion powder to be collected. This limits the deposit of abrasion powder between the power supply brushes 53 and 54 and the rotation shaft 14 and between the power supply brushes 53 and 54 and the armature core 15. Thus, a conductive line is not formed by abrasion powder between the power supply brush 53 and 54 and the rotation shaft 14 and between the power supply brushes 53 and 54 and the armature core 15. This limits insulation defects caused by the abrasion powder of the power supply brushes 53 and 54.

(2) The brush holder 21 includes the first tangential collecting recess 41 serving as the collecting recess 40. The first tangential collecting recess 41 is located in the brush holder 21 including the first tangent L3 of the outer circumferential surface of the commutator 17 at the contact point P1 between the first power supply brush 53 and the commutator 17. Further, the brush holder 21 includes the second tangential collecting recess 42 serving as the collecting recess 40. The second tangential collecting recess 42 is located in the brush holder 21 including the second tangent L4 of the outer circumferential surface of the commutator 17 at the contact point P2 between the second power supply brush 54 and the commutator 17. The abrasion powder produced when the power supply brushes 53 and 54 slide along the outer circumferential surface of the commutator 17 easily diffuse in the tangential direction of the outer circumferential surface of the commutator 17 at the contact points P1 and P2 between the power supply brushes 53 and 54 and the commutator 17. Thus, the first tangential collecting recess 41 and the second tangential collecting recess 42 efficiently collect the abrasion powder of the power supply brushes 53 and 54. This limits the formation of a conductive line with the abrasion powder between the power supply brushes 53 and 54 and the rotation shaft 14 and between the power supply brushes 53 and 54 and the armature core 15. As a result, the occurrence of insulation defects by the abrasion powder of the power supply brushes 53 and 54 is further suppressed.

(3) The auxiliary collecting recess 45 is arranged between the first tangential collecting recess 41 and the second tangential collecting recess 42, which are adjacent to each other in the circumferential direction, between the first power supply brush 53 and the second power supply brush 54, which are adjacent to each other in the circumferential direction. Thus, the abrasion powder of the power supply brushes 53 and 54, which are adjacent to each other in the circumferential direction, thus collects in the auxiliary collecting recess 45 and not only the two tangential collecting recesses 41 and 42. This further limits the formation of a conductive line by the abrasion powder between the power supply brushes 53 and 54 and the rotation shaft 14 and between the power supply brushes 53 and 54 and the armature core 15. The arrangement of the auxiliary collecting recess 45 increases the distance along the surface between the power supply brushes 53 and 54, which are adjacent to each other in the circumferential direction, in the brush holder 21. This limits short-circuiting of the power supply brushes 53 and 54, which are adjacent in the circumferential direction, by the abrasion powder on the surface of the brush holder 21 between the power supply brushes 53 and 54. Thus, insulation defects caused by abrasion powder of the power supply brushes 53 and 54 are further reduced.

(4) The contact point P1 between the commutator 17 and the first power supply brush 53 is separated in the circumferential direction from a circumferentially middle location of the first power supply brush 53. In the same manner, the contact point P2 between the commutator 17 and the second power supply brush 54 is separated in the circumferentially middle location of the second power supply brush 54. This easily stabilizes the circumferential positions of the power supply brushes 53 and 54 that slide along the commutator 17 during rotation of the rotation shaft 14. The first tangential collecting recess 41 is arranged at the position including the first tangent L3 of the outer circumferential surface of the commutator 17 at the contact point P1 between the first power supply brush 53 and the commutator 17. Thus, the first tangential collecting recess 41 efficiently collects the abrasion powder of the first power supply brush 53. Further, the second tangential collecting recess 42 is arranged at the position including the second tangent L4 of the outer circumferential surface of the commutator 17 at the contact point P2 between the second power supply brush 54 and the commutator 17. Thus, the second tangential collecting recess 42 efficiently collects the abrasion powder of the second power supply brush 54. Accordingly, the tangential collecting recesses 41 and 42 further limits the formation of a conductive line by the abrasion powder between the power supply brushes 53 and 54 and the rotation shaft 14 and between the power supply brushes 53 and 54 and the armature core 15. This further limits insulation defects caused by the abrasion powder of the power supply brushes 53 and 54.

(5) The two power supply brushes 53 and 54, which are adjacent in the circumferential direction, form the narrow angular range A1 and the wide angular range A2. The two tangential collecting recesses 41 and 42 are formed in the narrower angle range A1 of 90°. Accordingly, the two tangential collecting recesses 41 and 42 that collect the abrasion powder of the power supply brushes 53 and 54 are arranged where the interval in the circumferential direction between the power supply brushes 53 and 54 is small. This effectively limits short-circuiting of the two power supply brushes 53 and 54. As a result, insulation defects caused by the abrasion powder of the power supply brushes 53 and 54 are further limited.

(6) The first diffusion restriction projection 47 and the second diffusion restriction projection 48 are arranged in the opposing portion 33b at the outer side of the bearing holder 34. This increases, in the gap between the commutator 17 and the opposing portion 33b, the distance along the surface between the power supply brushes 53 and 54 that are adjacent to each other in the circumferential direction of the brush holder 21 and the distance along the surface between the power supply brushes 53 and 54 in the opposing portion 33b to the rotation shaft 14. The first diffusion restriction projection 47 and the second diffusion restriction projection 48 serve as obstacles that limit the diffusion of the abrasion powder from the power supply brushes 53 and 54 in the gap between the commutator 17 and the opposing portion 33b. This further limits insulation defects caused by the abrasion powder of the power supply brushes 53 and 54.

(7) The first diffusion restriction projection 47 is annular and surrounds the rotation shaft 14. This effectively suppresses the diffusion of the abrasion powder from the power supply brushes 53 and 54 in the radial direction at the gap between the commutator 17 and the opposing portion 33b.

(8) The first diffusion restriction projection 47 is located toward the inner side in the radial direction from the outer circumferential surface of the commutator 17 as viewed in the axial direction. This effectively limits the diffusion of abrasion powder of the power supply brushes 53 and 54 toward the rotation shaft 14, which is located at the inner side in the radial direction from the outer circumferential surface of the commutator 17.

(9) The second diffusion restriction projection 48 extends toward the outer side in the radial direction from the rotation shaft 14. This effectively limits the diffusion of abrasion powder from the power supply brushes 53 and 54 in the circumferential direction at the gap between the commutator 17 and the opposing portion 33b.

(10) The first tangential collecting recess 41 is formed by the first collecting projection 43, which projects toward the inner side from the inner circumferential surface of the circumferential wall 33a, the radially inner end of the first brush box 35, which projects toward the inner side from the inner circumferential surface of the circumferential wall 33a, and the circumferential wall 33a. The second tangential collecting recess 42 is formed by the second collecting projection 44, which projects toward the inner side from the inner circumferential surface of the circumferential wall 33a, the radially inner end of the second brush box 36, which projects toward the inner side from the inner circumferential surface of the circumferential wall 33a, and the circumferential wall 33a. Further, the auxiliary collecting recess 45 is formed between the first collecting projection 43 and the second collecting projection 44. This increases the distance along the surface of the brush holder 21 between the first power supply brush 53 and the second power supply brush 54 in the angular range A1 of 90° between the first power supply brush 53 and the second power supply brush 54. Thus, short-circuiting of the power supply brushes 53 and 54 caused by abrasion powder is easily limited. This further easily limits insulation defects caused by the abrasion powder of the power supply brushes 53 and 54.

(11) The bearing 52 held by the bearing holder 34 of the brush holder 21 is an oil-containing bearing. Thus, when the motor 1 is driven and heat is transmitted to the bearing 52, the lubricating oil of the bearing 52 may leak into the cover 33 along the rotation shaft 14. When the lubricating oil leaks into the cover 33 and mixes with the abrasion powder of the power supply brushes 53 and 54, a mass of abrasion powder may be formed. The mass of abrasion powder may cause insulation defects. In this regard, in the present embodiment, the first diffusion restriction projection 47 and the second diffusion restriction projection 48 are arranged outside the bearing holder 34. The first diffusion restriction projection 47 and the second diffusion restriction projection 48 limit the diffusion of abrasion powder from the power supply brushes 53 and 54 toward the bearing 52 and the rotation shaft 14 in the gap between the commutator 17 and the opposing portion 33b. Further, the first diffusion restriction projection 47 and the second diffusion restriction projection 48 limit the flow of the lubricating oil leaking out of the bearing 52 toward the outer side where the abrasion powder of the power supply brushes 53 and 54 tends to deposit. This limits the mixing of the abrasion powder of the power supply brushes 53 and 54 with the lubricating oil. This limits insulation defects caused by masses of abrasion powder formed when the abrasion powder of the power supply brushes 53 and 54 mixes with the lubricating oil.

(12) The opposing portion 33b of the brush holder 21 includes the diffusion restriction recess 49 that is recessed in the axial direction. The diffusion restriction recess 49 is arranged at the inner side in the radial direction from the outer circumferential surface of the commutator 17 and at the outer side in the radial direction from the bearing holder 34 as viewed in the axial direction. In this structure, the diffusion restriction recess 49 collects the lubricating oil leaking toward the outer side in the radial direction of the bearing holder 34 from the bearing 52 is collected. This limits the flow of the lubricating oil from the diffusion restriction recess 49 toward the outer side in the radial direction (portion where abrasion powder of the power supply brushes 53 and 54 is easily deposited). Thus, insulation defects, which would be caused by masses of abrasion powder formed when the abrasion powder of the power supply brushes 53 and 54 mixes with the lubricating oil, are limited.

(13) In the prior art, a wide open area is needed around the power supply brush to limit insulation defects caused by the abrasion powder of power supply brushes deposited in the brush holder. Alternatively, holes may be formed in the brush holder to release abrasion powder into the gear housing. This results in an enlarged motor or a motor having a complicated structure. In this regard, in the present embodiment, the collecting recesses 40 are arranged in the circumferential wall 33a facing the outer circumferential surface of the commutator 17. This limits insulation defects caused by the abrasion powder of the power supply brushes 53 and 54. Thus, insulation defects caused by the abrasion powder of the power supply brushes 53 and 54 are limited, while suppressing the enlargement of the motor 1 and simplifying the structure of the motor 1.

(14) The gear housing 71 includes the infiltration restriction flange 78. This further limits the infiltration of liquid into the gear housing 71 from the vent 76. The infiltration restriction flange 78 has a simple shape. Thus, even though the infiltration restriction flange 78 is used, the gear housing 71 still has a simple shape. This limits the infiltration of the liquid into the vent 76 without increasing manufacturing costs of the motor 1.

(15) The testing recess 85c is separated from the coupling portion 85a, which is coupled to the window regulator of the worm wheel 83. Thus, by using the testing recesses 85c that have similar shapes, the same testing jig may be used to test the operation performance of different types of worm wheels 83 with coupling portions 85a having different shapes. Thus, different types of testing jigs do not need to be prepared in accordance with the shape of the coupling portion 85a. This reduces the cost for conducting operation performance tests.

It should be apparent to those skilled in the art that the present invention may be embodied in many other specific forms without departing from the spirit or scope of the invention. Particularly, it should be understood that the present invention may be embodied in the following forms.

In the embodiment described above, the opposing portion 33b includes the single first diffusion restriction projection 47. However, the inner surface of the opposing portion 33b may include a plurality of first diffusion restriction projections 47. In this case, for example, the first diffusion restriction projections 47 may be formed concentrically at the outer side of the rotation shaft 14 in the radial direction. The first diffusion restriction projection 47 does not have to be annular as long as it surrounds the rotation shaft 14. Further, the first diffusion restriction projection 47 may be arcuate to extend in the circumferential direction.

In the embodiment described above, the brush holder 21 includes the first diffusion restriction projection 47 and the second diffusion restriction projection 48 located on the opposing portion 33b. However, the brush holder 21 may include only either one of the first diffusion restriction projection 47 and the second diffusion restriction projection 48 on the opposing portion 33b.

The diffusion stopper of the embodiment described above is formed by the first diffusion restriction projection 47 and the second diffusion restriction projection 48, which project in the axial direction, and the diffusion restriction recess 49, which is formed between the first diffusion restriction projection 47 and the bearing holder 34. However, for example, an annular groove may be formed in the inner surface of the opposing portion 33b in place of the first diffusion restriction projection 47. Further, a radial groove may be formed on the inner surface of the opposing portion 33b in place of the second diffusion restriction projection 48. In this manner, the opposing portion 33b only needs to include a diffusion stopper having the form of a projection or a recess in the axial direction at the outer side in the radial direction from the bearing holder 34

In the embodiment described above, the first tangential collecting recess 41 and the second tangential collecting recess 42 are arranged in the angular range A1 of 90° between the first power supply brush 53 (first brush box 35) and the second power supply brush 54 (second brush box 36). However, a tangential collecting recess similar to that of the above embodiment may be arranged in the angular range A2 of 270° between the first power supply brush 53 (first brush box 35) and the second power supply brush 54 (second brush box 36). In other words, a tangential collecting recess may be arranged at a position including the tangent of the outer circumferential surface of the commutator 17 at the contact point between the first power supply brush 53 and the commutator 17 in the angular range A2. In the same manner, the tangential collecting recess may be arranged at the position including the tangent of the outer circumferential surface of the commutator 17 at the contact point between the second power supply brush 54 and the commutator 17 in the angular range A2.

In the embodiment described above, the first power supply brush 53 and the second power supply brush 54, which are paired, are spaced apart from each other by 90° in the circumferential direction on the outer circumference of the commutator 17. However, the angle between the first power supply brush 53 and the second power supply brush 54 is not limited to 90° and may be varied. The number of power supply brushes in the motor 1 is not limited to two (pair) and may be three or more.

In the embodiment described above, the contact point P1 between the commutator 17 and the first power supply brush 53 is separated in the circumferential direction from the circumferentially middle part of the first power supply brush 53. In the same manner, the contact point P2 between the commutator 17 and the second power supply brush 54 is separated in the circumferential direction from the circumferential middle part of the second power supply brush 54. However, the contact point with the commutator 17 in each of the power supply brushes 53 and 54 is not limited. Each of the power supply brushes 53 and 54 may contact the circumferentially middle part of the commutator 17.

In the embodiment described above, the brush holder 21 includes the auxiliary collecting recess 45 but does not necessarily need to include the auxiliary collecting recess 45.

In the embodiment described above, the brush holder 21 includes the first tangential collecting recess 41 and the second tangential collecting recess 42 but does not need to include the first tangential collecting recess 41 and the second tangential collecting recess 42. The brush holder 21 may include only either one of the first tangential collecting recess 41 and the second tangential collecting recess 42. The brush holder 21 does not have to include both of the first tangential collecting recess 41 and the second tangential collecting recess 42 and may include only the simple collecting recess 46 regardless of the contact point between the power supply brushes 53 and 54 and the commutator 17. The number of simple collecting recesses 46 serving as the collecting recess 40 arranged in the brush holder 21 is not limited to four and only needs to be one or more. The brush holder 21 does not need to include the simple collecting recess 46 as long as it includes at least one of the first tangential collecting recess 41, the second tangential collecting recess 42, and the auxiliary collecting recess 45. The brush holder 21 does not need to include the collecting recess 40.

The shape of the testing recess 85c arranged in the worm wheel 83 is not limited to the shape of the embodiment described above. For example, the testing recess 85c may be a recess having a rectangular shape, a square shape, a semicircular shape, or the like as viewed in the axial direction. The testing recess 85c may be a hole (shaped so as not to open in the radial direction and open only in one side in the axial direction) formed in the axial end face of the testing recess 85c that is closer to the coupling portion 85a. The number of testing recesses 85c arranged in the worm wheel 83 is not limited to six and only need to be more than one. The worm wheel 83 does not need to include the testing recess 85c.

Figure 12:
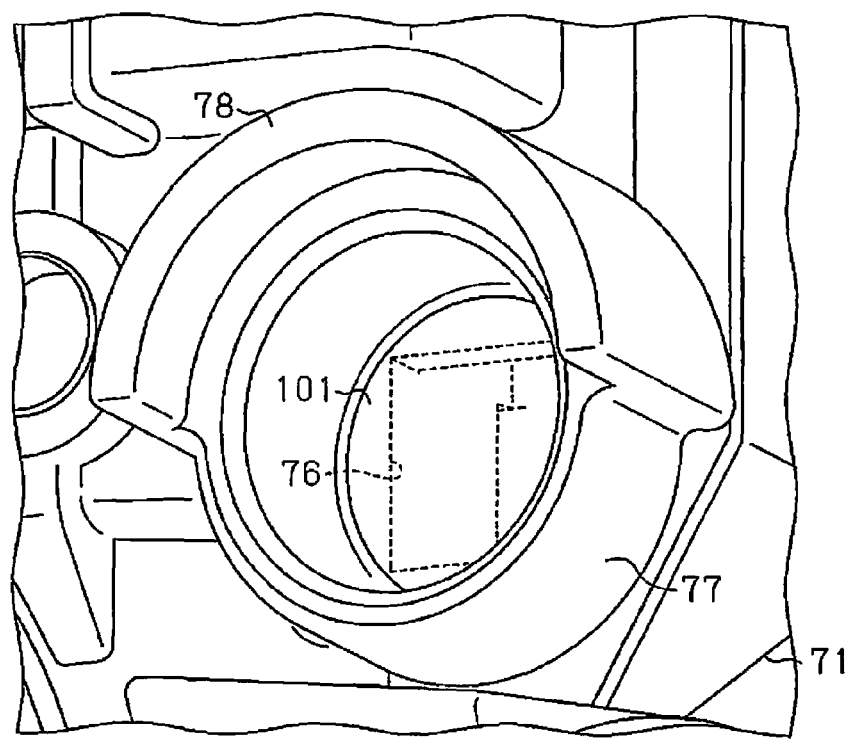
FIG. 12 is a partially enlarged perspective view of a gear housing in a further embodiment.

As shown in FIG. 12, the open end of the vent 76 at the outer side of the gear housing 71 may be covered by a waterproof sheet 101. The waterproof sheet 101 is gas permeable but not liquid permeable. This limits the infiltration of liquid from the vent 76 into the gear housing 71.

The projection amount of the infiltration restriction flange 78 in the same direction as the projecting direction of the surrounding portion 77 may be changed to a length that allows for the infiltration of liquid to be easily limited when the motor 1 is fastened. The gear housing 71 does not need to include the infiltration restriction flange 78.

In the embodiment described above, the motor 1 includes the speed reduction unit 3. However, the motor 1 does not need to include the speed reduction unit 3 and may be formed by only the motor unit 2.

In the embodiment described above, the motor 1 is used as a drive source for a power window device mounted on the vehicle. However, the motor 1 does not have to be a drive source of the power window device and may be used as a drive source for a different device.

The present examples and embodiments are to be considered as illustrative and not restrictive, and the invention is not to be limited to the details given herein, but may be modified within the scope and equivalence of the appended claims.

The invention claimed is:

1. A motor comprising:
   a rotation shaft;
   a commutator that rotates integrally with the rotation shaft;
   a plurality of power supply brushes that contact the commutator in a slidable manner; and
   a brush holder that holds the power supply brushes, wherein the brush holder includes
      an opposing portion that faces an end face of the commutator in an axial direction,
      a bearing holder that holds a bearing located on the opposing portion to axially support the rotation shaft, and
      a diffusion stopper arranged in a portion of the opposing portion located toward an outer side in a radial direction from the bearing holder, wherein the diffusion stopper limits diffusion of abrasion powder from the power supply brushes, and the diffusion stopper projects toward the commutator in the axial direction or is recessed in the axial direction, wherein:
   the rotation shaft extends through the opposing portion in the axial direction;
   the diffusion stopper includes an annular portion that surrounds the rotation shaft;
   the bearing held by the bearing holder is an oil-containing bearing; and
   the annular portion is located toward the inner side in the radial direction from an outer circumferential surface of the commutator and toward an outer side in the radial direction from the bearing holder as viewed in the axial direction.

2. The motor according to claim 1, wherein
   the diffusion stopper includes a plurality of radial portions that extend in the radial direction and are located toward an outer side in the radial direction from the rotation shaft.

3. The motor according to claim 1, wherein
the brush holder includes a collecting recess located toward an outer side in the radial direction from the commutator; and
the collecting recess includes an opening that faces an outer circumferential surface of the commutator.

4. The motor according to claim 3, wherein
the collecting recess includes a tangential collecting recess;
the brush holder includes the tangential collecting recess; and
the tangential collecting recess is located at a position of the brush holder including a tangent of the outer circumferential surface of the commutator extending from a contact point between the power supply brush and the commutator.

5. The motor according to claim 4, wherein
the collecting recess further includes an auxiliary collecting recess;
the brush holder includes the tangential collecting recess and the auxiliary collecting recess;
the tangential collecting recess is one of two tangential collecting recesses, each located at a portion of the brush holder between adjacent ones of the power supply brushes in a circumferential direction; and
the auxiliary collecting recess is located between the two tangential collecting recesses that are adjacent to each other in the circumferential direction.

6. The motor according to claim 4, wherein the contact point between the commutator and each power supply brush is located at a position separated in the circumferential direction from a circumferentially middle part of the power supply brush.

7. The motor according to claim 4, wherein
the plurality of power supply brushes include two power supply brushes;
the two power supply brushes are located toward an outer side in the radial direction from the commutator and arranged at an interval of less than 180° in the circumferential direction; and
the tangential collecting recess includes two tangential collecting recesses each located within an angular range of less than 180° between the two power supply brushes in the brush holder.

* * * * *